United States Patent
Kim et al.

(10) Patent No.: US 11,774,962 B2
(45) Date of Patent: Oct. 3, 2023

(54) CONTROL METHOD OF UNDERWATER VEHICLE, INTRODUCING METHOD OF UNDERWATER VEHICLE, RECOVERING METHOD OF UNDERWATER VEHICLE, CONTROL SYSTEM OF UNDERWATER VEHICLE, INTRODUCING/RECOVERING EQUIPMENT OF CONTROL SYSTEM OF UNDERWATER VEHICLE

(71) Applicant: National Institute of Maritime, Port and Aviation Technology, Tokyo (JP)

(72) Inventors: Kangsoo Kim, Tokyo (JP); Hiroyuki Yamato, Tokyo (JP)

(73) Assignee: NATIONAL INSTITUTE OF MARITIME, PORT AND AVIATION TECHNOLOGY, Tokyo (JP)

( * ) Notice: Subject to any disclaimer, the term of this patent is extended or adjusted under 35 U.S.C. 154(b) by 745 days.

(21) Appl. No.: 16/498,981

(22) PCT Filed: Mar. 30, 2018

(86) PCT No.: PCT/JP2018/013772
§ 371 (c)(1),
(2) Date: Sep. 27, 2019

(87) PCT Pub. No.: WO2018/181958
PCT Pub. Date: Oct. 4, 2018

(65) Prior Publication Data
US 2021/0109517 A1 Apr. 15, 2021

(30) Foreign Application Priority Data

Mar. 31, 2017 (JP) .................................. 2017-071896
Mar. 31, 2017 (JP) .................................. 2017-072283

(51) Int. Cl.
*G05D 1/03* (2006.01)
*G05D 1/04* (2006.01)
(Continued)

(52) U.S. Cl.
CPC ............ *G05D 1/0038* (2013.01); *B63B 79/40* (2020.01); *B63C 7/02* (2013.01); *B63G 8/001* (2013.01);
(Continued)

(58) Field of Classification Search
CPC ............ B60P 3/1058; B63G 2008/002; B63G 2008/005; B63G 2008/008; B63G 8/001;
(Continued)

(56) References Cited

U.S. PATENT DOCUMENTS 4,993,344 A * 2/1991 Jones ...................... F41H 11/05
114/240 R
5,579,285 A * 11/1996 Hubert .................... G01S 11/14
367/133
(Continued)

FOREIGN PATENT DOCUMENTS

DE 102010056539 A1 * 7/2012 ............. B63G 8/001
JP H03-266794 A 11/1991
(Continued)

OTHER PUBLICATIONS

A. V. Vyngra et al., "Modeling the Operation of an Uninsulated DC-DC Converter as a Part of a Propeller Drive of Autonomous Underwater Vehicles," 2020 IEEE Conf, of Russian Young Researchers in Electrical and Electronic Engineering (EIConRus), 2020, pp. 2431-2434, doi: 10.1109/EIConRus49466.2020.903 (Year: 2020).*
(Continued)

*Primary Examiner* — Cuong H Nguyen
(74) *Attorney, Agent, or Firm* — Kratz, Quintos & Hanson, LLP

(57) ABSTRACT

When on-water control means 20 having moving means and capable of moving near a water surface controls a multiple (Continued)

underwater vehicles 30 which cruise in water, the moving means 23 controls movement of the on-water control means 20 such that the multiple underwater vehicles 30 are located in a control region X where the on-water control means 20 can position the multiple underwater vehicles 30 utilizing acoustic positioning means 24 provided in the on-water control means 20. According to this, it is possible to deploy and operate the multiple underwater vehicles in water and safely and efficiently carry out survey operation and the like such as water bottom exploration.

22 Claims, 11 Drawing Sheets

(51) Int. Cl.
    *G05D 1/00*          (2006.01)
    *B63B 79/40*         (2020.01)
    *B63C 7/02*          (2006.01)
    *B63G 8/00*          (2006.01)
    *G05D 1/02*          (2020.01)

(52) U.S. Cl.
    CPC ........... *G05D 1/0206* (2013.01); *G05D 1/048* (2013.01); *B63G 2008/005* (2013.01)

(58) Field of Classification Search
    CPC ......... B63B 11/48; B63B 27/16; B63B 27/36; B63B 2027/165; B63B 79/40; B60D 1/0038; B63C 7/02; G05D 1/0206; G05D 1/048
    USPC ............................... 701/2; 367/133; 340/851
    See application file for complete search history.

(56) References Cited

U.S. PATENT DOCUMENTS

| | | | | |
|---|---|---|---|---|
| 5,667,341 | A * | 9/1997 | Kuehn | E02D 7/00 405/232 |
| 6,854,410 | B1 * | 2/2005 | King | G01S 15/88 114/244 |
| 7,156,036 | B2 * | 1/2007 | Seiple | B63B 27/143 114/259 |
| 7,712,429 | B1 * | 5/2010 | Gibson | B60P 3/1058 114/259 |
| 8,711,009 | B2 * | 4/2014 | Broman | B63G 8/001 340/984 |
| 8,757,083 | B2 * | 6/2014 | Kalwa | B63G 8/001 114/328 |
| 8,967,067 | B2 * | 3/2015 | Soreau | B63B 27/143 114/259 |
| 9,067,648 | B2 * | 6/2015 | Carcone | B63B 27/36 |
| 9,757,083 | B2 * | 9/2017 | Meetz | A61B 6/504 |
| 10,088,584 | B2 * | 10/2018 | Griffin | G01V 1/186 |
| 11,192,614 | B2 * | 12/2021 | Peleg | B63C 7/16 |
| 2011/0144836 | A1 | 6/2011 | Larkin | |
| 2017/0253301 | A1 * | 9/2017 | Pfuetzenreuter | B66C 23/52 |

FOREIGN PATENT DOCUMENTS

| | | |
|---|---|---|
| JP | H05-147583 A | 6/1993 |
| JP | H06-1993 Y2 | 1/1994 |
| JP | H10-81297 A | 3/1998 |
| JP | 2001-308766 A | 11/2001 |
| JP | 2002-145187 A | 5/2002 |
| JP | 2004-184268 A | 7/2004 |
| JP | 2009-227086 A | 10/2009 |
| JP | 2003-026090 A | 1/2013 |
| JP | 2016-144956 A | 8/2016 |
| WO | 2016/038453 A1 | 3/2016 |
| WO | WO-2017017701 A1 * | 2/2017 ............. B63B 27/16 |

OTHER PUBLICATIONS

C. D. Makavita, S. G. Jayasinghe, H. D. Nguyen and D. Ranmuthugala, "Experimental Study of Command Governor Adaptive Control for Unmanned Underwater Vehicles," in IEEE Transactions on Control Systems Technology, vol. 27, No. 1, pp. 332-345, Jan. 2019, doi: 10.1109/TCST.2017.2757021 (Year: 2019).*

S. E. Webster, L. L. Whitcomb and R. M. Eustice, "Advances in decentralized single-beacon acoustic navigation for underwater vehicles: Theory and simulation," 2010 IEEE/OES Autonomous Underwater Vehicles, 2010, pp. 1-8, doi: 10.1109/AUV.2010.5779677 (Year: 2010).*

Hubert Thomas (Document ID No. 310213 B1 Date Published Jun. 5, 2001), Method And Device For Remote Control And Monitoring Of Unmanned Mobile Underwater Vehicles. (Year: 2001).*

JP 2009227086 A, By Asano Yoichiro, Control Type Underwater Information Collecting System and Underwater Cruising Vessel Control System, Published Oct. 8, 2009, Date Filed Mar. 21, 2008. (Year: 2009).*

JP 2004184268 A by Toyama Satoshi et al., Underwater Resources Exploring Method and System Thereof; Date Published: Jul. 2, 2004; Date Filed Dec. 4, 2002 (Year: 2002).*

J. Wen, J. Yang, Y. Li, J. He, Z. Li and H. Song, "Behavior-Based Formation Control Digital Twin for Multi-AUG in Edge Computing, "in IEEE Transactions on Network Science and Engineering, 2022, doi: 10.1109/TNSE.2022.3198818 (Year:2022).*

H. Yao, H. Wang, Y. Li, Y. Wang and C. Han, "Research on Unmanned Underwater Vehicle Threat Assessment," in IEEE Access, vol. 7, pp. 11387-11396, 2019, doi: 10.1109/ACCESS.2019.2891940 (Year:2019).*

A. Manzanilla, S. Reyes, M. Garcia, D. Mercado and R. Lozano, "Autonomous Navigation for Unmanned Underwater Vehicles: Real-Time Experiments Using Computer Vision," in IEEE Robotics and Automation Letters, vol. 4, No. 2, pp. 1351-1356, Apr. 2019, doi: 10.1109/LRA.2019.2895272 (Year:2019).*

H. Zhao, J. Wei, S. Huang, L. Zhou and Q. Tang, "Regular Topology Formation Based on Artificial Forces for Distributed Mobile Robotic Networks," in IEEE Transactions on Mobile Computing, vol. 18, No. 10, pp. 2415-2429, Oct. 1, 2019, doi: 10.1109/TMC.2018.2873015 (Year:2019).*

Supplementary European Search Report for corresponding European Patent Application No. 18774212.7 dated Dec. 4, 2020 (14 sheets).

International Search Report for International Application No. PCT/JP2018/013772 dated Jun. 19, 2018 (3 sheets, 2 sheets translation, 5 sheets total).

Written Opinion of the International Searching Authority for International Application No. PCT/JP2018/013772 dated Jun. 19, 2018 (5 sheets).

Office Action of Korean Patent Application No. 10-2019-7027469: Notice of Reasons for Refusal dated May 14, 2022 (10 sheets, 10 sheets translation, 20 sheets total).

* cited by examiner

CONTROL METHOD OF UNDERWATER VEHICLE, INTRODUCING METHOD OF UNDERWATER VEHICLE, RECOVERING METHOD OF UNDERWATER VEHICLE, CONTROL SYSTEM OF UNDERWATER VEHICLE, INTRODUCING/RECOVERING EQUIPMENT OF CONTROL SYSTEM OF UNDERWATER VEHICLE

TECHNICAL FIELD

The present invention relates to a control method, an introducing method, a recovering method, a control system of an underwater vehicle for conducting survey operation such as water bottom exploration, and an introducing/recovering equipment of the control system.

BACKGROUND TECHNIQUE

When an underwater vehicle is introduced into a research water area to conduct survey operation such as water bottom exploration in marine and lake, a ship located on water or a device placed in water controls the underwater vehicle.

For example, patent document 1 discloses a technique in which an underwater station connected to a mother ship through a cable is placed in seawater, an acoustic transponder is placed undersea in the vicinity of an exploration position point, a multiple no-cable type unmanned submersible vessels are induced by introducing them into communication with the underwater station and the acoustic transponder using an ultrasonic wave signal, the no-cable type unmanned submersible vessels are docked to the underwater station if necessary, battery is charged or battery is exchanged and exploration data is retrieved.

Patent document 2 discloses a technique in which an underwater station having a first transponder, a first wave receiver and a second wave receiver is suspended in seawater from a mother ship, a second transponder is placed undersea, an autonomous unmanned vehicle for exploration is provided with a third transponder and a third wave receiver, the underwater station holds a fixed point by receiving a signal of the second transponder by means of the first wave receiver, the autonomous unmanned vehicle self-navigates by receiving a signal of the second transponder by means of the third wave receiver during exploration, and if power is reduced, the autonomous unmanned vehicle cruises toward the underwater station by receiving a signal of the first transponder by means of the third wave receiver, and the underwater station controls attitude for storing autonomous unmanned cruising by receiving a signal of the third transponder by means of the second wave receiver.

Patent document 3 discloses a technique in which a mother ship located on the water is provided with a transmitter, an unmanned submersible for exploration is provided with a wave receiver, and in underwater acoustic communication for sending a control signal from the mother ship to the unmanned submersible, transmission errors are corrected utilizing Hough transform of a pixel signal.

Patent document 4 discloses a technique in which a self-propelled repeater which relays communication between a mother ship and an underwater vehicle is placed in the vicinity of a water surface of an observation region, communication between the self-propelled repeater and the mother ship is carried out by waving, and communication between the self-propelled repeater and the underwater vehicle is carried out by acoustic communication, thereby enhancing a communication-possible distance in a horizontal direction.

PRIOR ART DOCUMENTS

Patent Documents

[Patent Document 1] Japanese Patent Application Laid-open No. H3-266794
[Patent Document 2] Japanese Patent Application Laid-open No. 2003-26090
[Patent Document 3] Japanese Patent Application Laid-open No. H5-147583
[Patent Document 4] Japanese Patent Application Laid-open No. 2001-308766

SUMMARY OF THE INVENTION

Problem to be Solved by the Invention

Meanwhile, since speed of the underwater vehicle is slow, if the number of the underwater vehicles is only one, it takes time to research a wide water area, but from the aspect of energy consumption, there is a limit to increase the speed of the underwater vehicle. Hence, to efficiently research a wide water area, it can be considered to introduce a multiple underwater vehicles. However, if the multiple underwater vehicles are introduced in, if the underwater vehicles are not strictly controlled, there is fear that the underwater vehicle disappears, the underwater vehicles collide against each other, or the underwater vehicle collides against a rough water bottom land form or the like. Further, when research is carried out using a multiple underwater vehicles, it takes time for the introducing and recovering operations as compared with a case where the research is carried out using one underwater vehicle. It is general that the introducing and recovering operations of the underwater vehicle are carried out using a special or dedicated ship having a special or dedicated equipment, and it is necessary to wait until schedule of the dedicated ship is opened. Therefore, there is a problem that schedule of the research does not proceed as desired.

According to an invention described in patent document 1, the acoustic transponder for inducing the no-cable type unmanned submersible is fixed to the undersea or the underwater station and the mother ship are connected to each other through a cable. Therefore, it is difficult to freely move the acoustic transponder and the underwater station in accordance with positions of the multiple no-cable type unmanned submersibles, and change a control region. Therefore, if the no-cable type unmanned submersible moves away from a region where it can be induced, a possibility that sight of the no-cable type unmanned submersible is lost as it is is high. Further, patent document 1 does not disclose that the introducing/recovering operation of the underwater station and the multiple no-cable type unmanned submersibles is efficiently and safely carried out.

According to an invention described in patent document 2, since the second transponder is fixed to the undersea and the underwater station is suspended from the mother ship, it is difficult, to freely move the second transponder and the underwater station in accordance with a position of the autonomous unmanned vehicle and change the control region. Therefore, if the autonomous unmanned vehicle moves away from a region where it can be induced, a possibility that sight of the autonomous unmanned vehicle is lost as it is is high. Further, patent document 2 does not disclose that the introducing/recovering operation of the underwater station and the multiple autonomous unmanned vehicles is efficiently and safely carried out.

According to an invention described in patent document 3, the fact that underwater acoustic communication is subject to effects of reflection sound of a water surface and sea bottom is taken into consideration, unmanned submersible is prevented from being introduced into an uncontrolled state by estimating a correct control signal even if transmission errors are included therein. However, if the unmanned submersible exceeds a substantially conical underwater acoustic communication-possible region having the mother ship as its apex, the communication is interrupted. Further, patent document 3 does not disclose the control when a multiple unmanned submersibles are introduced in. Further, patent document 3 does not disclose that the introducing/recovering operation of the multiple unmanned submersibles is efficiently and safely carried out.

Patent document 4 describes an invention that a self-propelled repeater determines whether there is horizontal movement based on current position information of the self-propelled repeater and current position information of an underwater vehicle, and a communication state with respect to the underwater vehicle is maintained. It is also described that a multiple underwater vehicles can be introduced. However, if the multiple underwater vehicles are introduced, patent document 4 does not described at all as to how to control the movement of the self-propelled repeater, and as to whether control of the multiple underwater vehicles should be maintained. Further, in patent document 4, the self-propelled repeater maintains a communication state with respect to the underwater vehicle, and does not move based on positioning. Patent document 4 does not disclose that introducing/recovering operation of the self-propelled repeater and the underwater vehicle is carried out efficiently and safely.

Hence, it is an object of the present invention to provide a control method of an underwater vehicle, an introducing method of the underwater vehicle, a recovering method of the underwater vehicle, a control system of the underwater vehicle, and an introducing/recovering equipment of the control system of the underwater vehicle capable of safely and efficiently carrying out a survey operation such as water bottom exploration by deploying and operating a multiple underwater vehicles under water.

Means for Solving the Problem

In a control method of an underwater vehicle, when on-water control means having moving means and capable of moving near a water surface controls a multiple underwater vehicles which cruise underwater, the moving means controls movement of the on-water control means such that the multiple underwater vehicles are located in a control region where the on-water control means can carry out positioning the multiple underwater vehicles utilizing acoustic positioning means provided in the on-water control means.

According to the invention, since the on-water control means moves to a position where the multiple underwater vehicles can be positioned, it is possible to position the multiple underwater vehicles in the control region and continue a survey operation and the like. Further, an underwater vehicle which deviates from the control region can be returned within the control region. According to this, a multiple underwater vehicles can be deployed and operated and a survey operation such as water bottom exploration can safely and efficiently be carried out.

The survey operation and the like include ail of operation actions carried out by the underwater vehicle in water bottom such as a collecting operation, a rescue operation a transport operation, an observing operation, and a searching operation in addition to the survey operation itself.

In the present invention, the moving means controls movement of the on-water control means utilizing communication means which are respectively provided in the on-water control means and the multiple underwater vehicles.

According to the invention, by moving the on-water control means to a position where it is possible to communicate with a multiple underwater vehicles, a survey operation and the like can safely and efficiently be carried out.

In the present invention, the on-water control means is moved to a position where the on-water control means can control all of the multiple underwater vehicles.

According to the invention, since all of the underwater vehicles are placed under control of the on-water control means, a survey operation and the like can safely and efficiently be carried out.

In the present invention, the on-water control means is moved to a position where the on-water control means can control maximum number of the multiple underwater vehicles.

According to the invention, the number of underwater vehicles which deviate from the control region can be minimized.

In the present invention, the maximum number is a number obtained by subtracting, from the number of the multiple underwater vehicles, the number of uncontrollable underwater vehicles including any of: the underwater vehicle which deviates from the control region; the damaged underwater vehicle; and the emergency surfaced underwater vehicle.

According to the invention, the multiple underwater vehicles which can be researched are located in the control region, and the survey operation and the like can be continued.

In the present invention, when the on-water control means is moved, the on-water control means is moved in a range where the number of the multiple underwater vehicles located in the control region when the movement is started is not reduced.

According to the invention, it is possible to prevent the number of the underwater vehicles located in the control region from being reduced.

In the present invention, before the on-water control means is moved, if it is detected that the underwater vehicle deviates from the control region, the on-water control means keeps on standby for predetermined time and then, the on-water control means starts moving.

According to the invention, there are a possibility that an underwater vehicle which deviates from the control region returns into the control region by itself, and a possibility that it is detected an underwater vehicle actually located in the control region deviates from the control region by temporal positioning failure or communication failure. Therefore, it is possible to lower a possibility that the on-water control means unnecessarily moves by making the on-water control means keep on standby. According to this, it is possible to prevent waste of energy of the on-water control means and prevent an underwater vehicle located in the control region from deviating from the control region.

In the present invention, the on-water control means is moved based on cruising record of the multiple underwater vehicles in the on-water control means.

According to the invention, control precision and moving efficiency of the on-water control means can be enhanced.

In the present invention, the on-water control means is moved in a direction in which it is estimated that the underwater vehicle which deviates from the control region exists based on the cruising record of the underwater vehicle which deviates from the control region among the multiple underwater vehicles.

According to the invention, it is possible to enhance the moving efficiency of the on-water control means, and return the underwater vehicle which deviates from the control region into the control region faster.

In the present invention, when the underwater vehicle detects that it deviates from the control region, the underwater vehicle reversely returns a path through which the underwater vehicle cruises heretofore or the underwater vehicle cruises in a direction in which a depth in the underwater is increased.

According to the invention, the underwater vehicle can return into the control region by itself.

In an introducing method of an underwater vehicle, when the multiple underwater vehicles are introduced into underwater, the on-water control means is first launched and then, the multiple underwater vehicles are sequentially introduced into underwater.

According to the invention, since the on-water control means first launches, control of the underwater vehicle can swiftly be started by the on-water control means after the underwater vehicle is introduced. According to this, efficiency and safety of the introducing operation are enhanced.

In the present invention, the first launched on-water control means moves such that it separates from the mother ship by a predetermined distance after the on-water control means launches.

According to the invention, an underwater vehicle which is introduced later does not collide against the on-water control means, the introducing operation is not hindered, and it is possible to control a multiple introduced underwater vehicles. According to this, efficiency and safety of the introducing operation are further enhanced.

In the present invention, introducing order of the multiple underwater vehicles is determined while taking settling speed and/or submerging speed of the underwater vehicles into account.

According to the invention, an underwater vehicle having slower settling speed and slower submerging speed than other underwater vehicle is first introduced for example. According to this, it is possible to shorten time elapsed before the survey operation is started, and enhance the efficiency of the entire survey operation. Further, by arranging the introducing order while taking, into account, a difference of settling speed and submerging speed between the underwater vehicles, it is possible to prevent the introduced underwater vehicles from colliding against each other, and safety is enhanced.

In the present invention, exploration depths of the multiple underwater vehicles are set in the underwater vehicles on the mother ship, and the exploration depths are input to the on-water control means.

According to the invention, at preset exploration depth, a multiple underwater vehicles can be made to carry out the survey operation while receiving control of the on-water control means. Further, without touching water, exploration depth can be input on the mother ship where a wide operation space can be secured.

In a recovering method of an underwater vehicle, when the multiple underwater vehicles are recovered from underwater, after the multiple underwater vehicles are sequentially recovered from the underwater, the on-water control means is recovered.

According to the invention, it is possible to recover an underwater vehicle while grasping a position and a communication state of the underwater vehicle by the on-water control means. According to this, efficiency and safety of the recovering operation are enhanced.

In the present invention, the later recovered on-water control means keeps on standby at a position separated from the mother ship by a predetermined distance while the multiple underwater vehicles are recovered.

According to the invention, a surfacing underwater vehicle does not collide against the on-water control means, the recovering operation is not hindered, and control of a multiple underwater vehicles which wait for recovering can be carried out through to completion. According to this, efficiency and safety of the recovering operation are further enhanced.

In the present invention, recovering order of the multiple underwater vehicles is surfaced order.

According to the invention, it is possible to prevent a later surfaced underwater vehicle from colliding against a faster surfaced underwater vehicle. It is possible to prevent a case where water washes a surfaced underwater vehicle away and sight thereof is lost.

In the present invention, the on-water control means controls until a recovering operation of the multiple underwater vehicles is completed.

According to the invention, control of the underwater vehicles by the on-water control means is continued until all of the underwater vehicles are recovered. Therefore, efficiency and safety of the recovering operation are enhanced.

In a control system of an underwater vehicle, the control system includes on-water control means having moving means and capable of cruising near a water surface, the multiple underwater vehicles which cruises in water, and acoustic positioning means provided in the on-water control means, wherein the on-water control means includes a movement-control means which controls movement of the on-water control means by the moving means such that the multiple underwater vehicles are located in a control region where the on-water control means can carry out positioning the multiple underwater vehicles by the acoustic positioning means.

According to the invention, since the on-water control means moves to a position where a multiple underwater vehicles can be positioned, the multiple underwater vehicles can be located in the control region, and the survey operation and the like can be continued. Further, the on-water control means which deviates from the control region can be returned into the control region. According to this, a wide water area can be researched safely and efficiently without losing the sight of the multiple underwater vehicles.

In the present invention, the on-water control means and the multiple underwater vehicles further respectively include communication means, the movement-control means controls movement such that the multiple underwater vehicles are located in the control region where the multiple underwater vehicles and the communication means can communicate with each other.

According to the invention, by moving the on-water control means to a position where the on-water control means is allowed to communicate with a multiple underwater vehicles, the survey operation and the like can be carried out more safely and efficiently.

In the present invention, the movement-control means includes a number-managing section which manages the number of the multiple underwater vehicles.

According to the invention, movement of the on-water control means can be controlled based on the number of the underwater vehicles.

In the present invention, the number-managing section manages the number of the underwater vehicles while taking, into account, the number of uncontrollable underwater vehicles including any of: the underwater vehicle which deviates from the control region; the damaged underwater vehicle; and the emergency surfaced underwater vehicle.

According to the invention, a multiple underwater vehicles which can research are located in the control region, and the survey operation and the like can be continued.

In the present invention, when the movement-control means moves the on-water control means, the movement-control means controls such that the on-water control means moves within a range where the number of the multiple underwater vehicles located in the control region when the movement is started is not reduced.

According to the invention, it is possible to prevent the number of underwater vehicles located in the control region from being reduced.

In the present invention, the movement-control means includes a standby-control section which instructs such that when it is detected that the underwater vehicle deviates from the control region, the on-water control means is kept on standby for predetermined time and then, the on-water control means starts moving.

According to the invention, there are a possibility that an underwater vehicle which deviates from the control region returns into the control region by itself, and a possibility that it is detected an underwater vehicle which is actually located in the control region deviates from the control region by temporary measuring or communication failure. Therefore, by making the on-water control means keep on standby, it is possible to lower a possibility that the on-water control means unnecessarily moves. According to this, it is possible to prevent waste of energy of the on-water control means and prevents an underwater vehicle located in the control region from deviating from the control region.

In the present invention, the movement-control means includes a cruising-recording section which records cruising of the multiple underwater vehicles.

According to the invention, control precision and moving efficiency of the on-water control means can be enhanced.

In the present invention, the movement-control means controls the on-water control means to move in a direction in which it is estimated that the underwater vehicle which deviates from the control region exists based on the cruising record of the multiple underwater vehicles in the cruising-recording section.

According to the invention, moving efficiency of the on-water control means can be enhanced, and an underwater vehicle which deviates from the control region can be returned into the control region faster.

In the present invention, each of the underwater vehicles includes cruising-control means and own vehicle positioning means, when the cruising-control means detects that the underwater vehicle deviates from the control region, the cruising-control means estimates a position of the own vehicle by the own vehicle positioning means, and the cruising-control means makes the underwater vehicle return a path through which the underwater vehicle cruises heretofore or makes the underwater vehicle cruise in a direction in which a depth in the underwater is increased.

According to the invention, an underwater vehicle can return into the control region by itself.

In an introducing/recovering equipment of a control system of an underwater vehicle, the introducing/recovering equipment includes an introducing/recovering equipment, an on-water control means-pedestal on which the on-water control means is placed, underwater vehicle-pedestals on which a multiple underwater vehicles are placed, and interchanging means for interchanging a position of the on-water control means-pedestal and a position of the underwater vehicle-pedestals with respect to the introducing/recovering equipment.

According to the invention, an on-water control means and a multiple underwater vehicles can stably be placed and interchanged. Therefore, the introducing and recovering operations can smoothly be carried out.

In the present invention, the introducing/recovering equipment further includes setting means for setting exploration depths of the multiple underwater vehicles.

According to the invention, exploration depth of a multiple underwater vehicles can be set by an operator or setting means.

In the present invention, the introducing/recovering equipment further includes display means for displaying set introducing order and/or set recovering order of the multiple underwater vehicles.

According to the invention, it is possible to prevent the introducing order error or the recovering order error of a multiple underwater vehicles. According to this, efficiency and safety of operation are enhanced.

In the present invention, the introducing/recovering equipment includes a function to launch and recover the on-water control means.

According to the invention, an underwater vehicle and an on-water control means can be launched, introduced and recovered using the same equipment.

In the present invention, the mother ship is a general ship, and the introducing/recovering equipment includes a crane which is mounted in the general ship.

According to the invention, since the survey operation can be carried out for the mother ship by an underwater vehicle using not only a dedicated ship but also a general ship. Therefore, the survey operation and the like can be carried without being swayed by schedule of the dedicated ship.

Effect Of The Invention

According to a control method of an underwater vehicle of the present invention, since the on-water control means moves to a position where a multiple underwater vehicles can be positioned, it is possible to position the multiple underwater vehicles in the control region and continue a survey operation and the like. Further, an underwater vehicle which deviates from the control region can be returned within the control region. According to this, a multiple underwater vehicles can be deployed and operated and a survey operation such as water bottom exploration can safely and efficiently be carried out.

When the moving means controls movement of the on-water control means utilizing communication means which are respectively provided in the on-water control means and the multiple underwater vehicles, by moving the on-water control means to a position where it is possible to communicate with a multiple underwater vehicles, a survey operation and the like can safely and efficiently be carried out.

When the on-water control means is moved to a position where the on-water control means can control all of the multiple underwater vehicles, since all of the underwater vehicles are placed under control of the on-water control means, a survey operation and the like can safely and efficiently be carried out.

When the on-water control means is moved to a position where the on-water control means can control maximum number of the multiple underwater vehicles, the number of underwater vehicles which deviate from the control region can be minimized.

When the maximum number is a number obtained by subtracting, from the number of the multiple underwater vehicles, the number of uncontrollable underwater vehicles including any of: the underwater vehicle which deviates from the control region; the damaged underwater vehicle; and the emergency surfaced underwater vehicle, the multiple underwater vehicles which can be researched are located in the control region, and the survey operation and the like can be continued.

When the on-water control means is moved, if the on-water control means is moved in a range where the number of the multiple underwater vehicles located in the control region when the movement is started is not reduced, it is possible to prevent the number of the underwater vehicles located in the control region from being reduced.

Before the on-water control means is moved, if it is detected that the underwater vehicle deviates from the control region, the on-water control means keeps on standby for predetermined time and then, the on-water control means starts moving, it is possible to lower a possibility that the on-water control means unnecessarily moves by making the on-water control means keep on standby. According to this, it is possible to prevent waste of energy of the on-water control means and prevent an underwater vehicle located in the control region from deviating from the control region.

When the on-water control means is moved based on cruising record of the multiple underwater vehicles in the on-water control means, control precision and moving efficiency of the on-water control means can be enhanced.

When the on-water control means is moved in a direction in which it is estimated that the underwater vehicle which deviates from the control region exists based on the cruising record of the underwater vehicle which deviates from the control region among the multiple underwater vehicles, it is possible to enhance the moving efficiency of the on-water control means, and return the underwater vehicle which deviates from the control region into the control region faster.

When the underwater vehicle detects that it deviates from the control region, if the underwater vehicle reversely returns a path through which the underwater vehicle cruises heretofore or if the underwater vehicle cruises in a direction in which a depth in the underwater is increased, the underwater vehicle can return into the control region by itself.

According to the introducing method of the underwater vehicle of the present invention, since the on-water control means first launches, control of the underwater vehicle can swiftly be started by the on-water control means after the underwater vehicle is introduced. According to this, efficiency and safety of the introducing operation are enhanced.

When the first launched on-water control means moves such that it separates from the mother ship by a predetermined distance after the on-water control means launches, an underwater vehicle which is introduced later does not collide against the on-water control means, the introducing operation is not hindered, and it is possible to control a multiple introduced underwater vehicles. According to this, efficiency and safety of the introducing operation are further enhanced.

When introducing order of the multiple underwater vehicles is determined while taking settling speed and/or submerging speed of the underwater vehicles into account, an underwater vehicle having slower settling speed and slower submerging speed than other underwater vehicle is first introduced for example. According to this, it is possible to shorten time elapsed before the survey operation is started, and enhance the efficiency of the entire survey operation. Further, by arranging the introducing order while taking, into account, a difference of settling speed and submerging speed between the underwater vehicles, it is possible to prevent the introduced underwater vehicles from colliding against each other, and safety is enhanced.

When exploration depths of the multiple underwater vehicles are set in the underwater vehicles on the mother ship, and the exploration depths are input to the on-water control means, at preset exploration depth, a multiple underwater vehicles can be made to carry out the survey operation while receiving control of the on-water control means. Further, without touching water, exploration depth can be input on the mother ship where a wide operation space can be secured.

According to the recovering method of the underwater vehicle of the invention, it is possible to recover an underwater vehicle while grasping a position and a communication state of the underwater vehicle by the on-water control means. According to this, efficiency and safety of the recovering operation are enhanced.

The later recovered on-water control means keeps on standby at a position separated from the mother ship by a predetermined distance while the multiple underwater vehicles are recovered, a surfacing underwater vehicle does not collide against the on-water control means, the recovering operation is not hindered, and control of a multiple underwater vehicles which wait for recovering can be carried out through to completion. According to this, efficiency and safety of the recovering operation are further enhanced.

If recovering order of the multiple underwater vehicles is surfaced order, it is possible to prevent a later surfaced underwater vehicle from colliding against a faster surfaced underwater vehicle. It is possible to prevent a case where water washes a surfaced underwater vehicle away and sight thereof is lost.

When the on-water control means controls until a recovering operation of the multiple underwater vehicles is completed, control of the underwater vehicles by the on-water control means is continued until all of the underwater vehicles are recovered. Therefore, efficiency and safety of the recovering operation are enhanced.

According to the control system of an underwater vehicle of the invention, since the on-water control means moves to a position where a multiple underwater vehicles can be positioned, the multiple underwater vehicles can be located in the control region, and the survey operation and the like can be continued. Further, the on-water control means which deviates from the control region can be returned into the control region. According to this, a wide water area can be researched safely and efficiently without losing the sight of the multiple underwater vehicles.

When the on-water control means and the multiple underwater vehicles further respectively include communication means, the movement-control means controls movement such that the multiple underwater vehicles are located in the control region where the multiple underwater vehicles and the communication means can communicate with each other, by moving the on-water control means to a position where the on-water control means is allowed to communicate with a multiple underwater vehicles, the survey operation and the like can be carried out more safely and efficiently.

When the movement-control means includes a number-managing section which manages the number of the multiple underwater vehicles, movement of the on-water control means can be controlled based on the number of the underwater vehicles.

When the number-managing section manages the number of the underwater vehicles while taking, into account, the number of uncontrollable underwater vehicles including any of: the underwater vehicle which deviates from the control region; the damaged underwater vehicle; and the emergency surfaced underwater vehicle, a multiple underwater vehicles which can research are located in the control region, and the survey operation and the like can be continued.

When the movement-control means moves the on-water control means, if the movement-control means controls such that the on-water control means moves within a range where the number of the multiple underwater vehicles located in the control region when the movement is started is not reduced, it is possible to prevent the number of underwater vehicles located in the control region from being reduced.

When the movement-control means includes a standby-control section which instructs such that when it is detected that the underwater vehicle deviates from the control region, the on-water control means is kept on standby for predetermined time and then, the on-water control means starts moving, there are a possibility that, an underwater vehicle which deviates from the control region returns into the control region by itself, and a possibility that it is detected an underwater vehicle which is actually located in the control region deviates from the control region by temporary measuring or communication failure. Therefore, by making the on-water control means keep on standby, it is possible to lower a possibility that the on-water control means unnecessarily moves. According to this, it is possible to prevent waste of energy of the on-water control means and prevents an underwater vehicle located in the control region from deviating from the control region.

When the movement-control means includes a cruising-recording section which records cruising of the multiple underwater vehicles, control precision and moving efficiency of the on-water control means can be enhanced.

When the movement-control means controls the on-water control means to move in a direction in which it is estimated that the underwater vehicle which deviates from the control region exists based on the cruising record of the multiple underwater vehicles in the cruising-recording section, moving efficiency of the on-water control means can be enhanced, and an underwater vehicle which deviates from the control region can be returned into the control region faster.

Each of the underwater vehicles includes cruising-control means and own vehicle positioning means, when the cruising-control means detects that the underwater vehicle deviates from the control region, the cruising-control means estimates a position of the own vehicle by the own vehicle positioning means, and the cruising-control means makes the underwater vehicle return a path through which the underwater vehicle cruises heretofore or makes the underwater vehicle cruise in a direction in which a depth in the underwater is increased, an underwater vehicle can return into the control region by itself.

According to the introducing/recovering equipment of the control system of the underwater vehicle of the invention, an on-water control means and a multiple underwater vehicles can stably be placed and interchanged. Therefore, the introducing and recovering operations can smoothly be carried out.

When the introducing/recovering equipment further includes setting means for setting exploration depths of the multiple underwater vehicles, exploration depths of a multiple underwater vehicles can be set by an operator or setting means.

When the introducing/recovering equipment further includes display means for displaying set introducing order and/or set recovering order of the multiple underwater vehicles, it is possible to prevent the introducing order error or the recovering order error of a multiple underwater vehicles. According to this, efficiency and safety of operation are enhanced.

When the introducing/recovering equipment includes a function to launch and recover the on-water control means, an underwater vehicle and an on-water control means can be launched, introduced and recovered using the same equipment.

When the mother ship is a general ship, and the introducing/recovering equipment includes a crane which is mounted in the general ship, since the survey operation can be carried out for the mother ship by an underwater vehicle using not only a dedicated ship but also the general ship. Therefore, the survey operation and the like can be carried without being swayed by schedule of the dedicated ship.

MODE FOR CARRYING OUT THE INVENTION

A control method of an underwater vehicle, an introducing method of the underwater vehicle, a recovering method of the underwater vehicle, a control system of the underwater vehicle, and an introducing/recovering equipment of the control system of the underwater vehicle according to an embodiment of the present invention will be described below.

Figure 1:
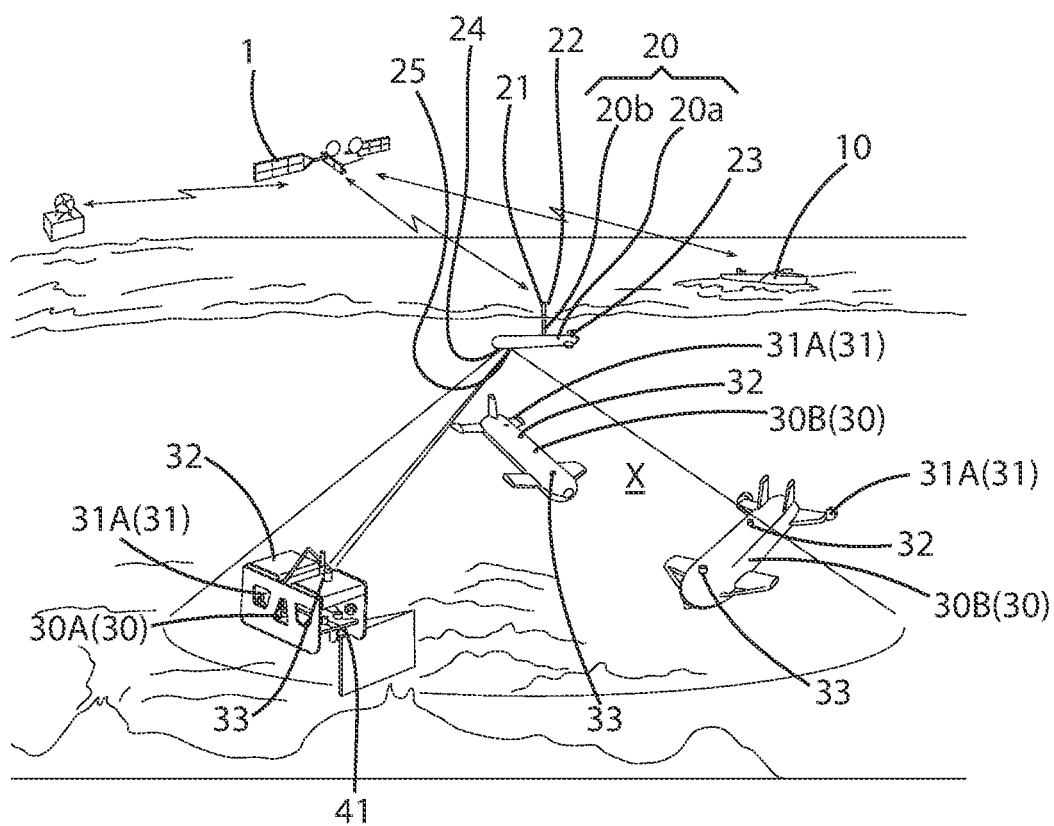
FIG. 1 is a schematic configuration diagram of a control system of an underwater vehicle according to an embodiment of the present invention.

FIG. 1 is a schematic configuration diagram of the control system of the underwater vehicle according to the embodiment of the invention, and FIG. 2 are perspective views of an outward appearance of the underwater vehicle.

FIG. 1 shows a state in which one on-water control means 20 is made to launch in a research water area in marine or lake, and a multiple underwater vehicles 30 are introduced, and a water bottom is explored, thereby carrying out a survey operation and the like of mineral resource, energy resource and the like of the water bottom. The on-water control means 20 and the underwater vehicles 30 are loaded in a mother ship (support ship), and they are transported to the research water area.

The on-water control means 20 and the underwater vehicles 30 are no-cable type unmanned autonomous cruising robots. Since radio waves are not transmitted in water, the on-water control means 20 which is placed in the vicinity of a water surface controls, utilizing acoustic signals, the multiple underwater vehicles 30 which carry out the survey operation and the like in water.

An offshore repeater (ASV: Autonomous Surface Vehicle) is used as the on-water control means 20. The on-water control means 20 includes a cylindrical main body 20a having a hemisphere end, and a vertical blade 20b extending from an upper surface of the main body 20a. The on-water control means 20 which is launched from the mother ship 10 into the research water area is used in a semi-submersible state where the main body 20a is submerged underwater and an upper portion of the vertical blade 20b projects from a water surface. Own position grasping means 21 such as GPS and maritime communication means 22 such as a satellite communication antenna and a wireless LAN antenna are placed on the upper portion of the vertical blade 20b. The on-water control means 20 can grasp own position by receiving GNSS signals from a GNSS (global navigation satellite system) satellite 1 using own position grasping means 21. Communication with the mother ship 10 can be established using the maritime communication means 22.

A rear portion of the main body 20a is provided with moving means 23 having a rudder and a propeller, and the main body 20a can move in the vicinity of a water surface by the moving means 23.

A lower surface of the main body 20a is provided with acoustic positioning means 2'1 and communication means 25. The communication means 25 includes a transmitter which sends acoustic wave and a wave receiver which receives acoustic wave. The on-water control means 20 measures a position of the underwater vehicle 30 using the acoustic positioning means 24, and bidirectionally communicates with the underwater vehicle 30 by acoustic signals using the communication means 25, and controls the underwater vehicle 30. The acoustic signals sent from the on-water control means 20 toward underwater easily reach within a substantially conical range having the on-water control means 20 as an apex. Therefore, this substantially conical range controlled by the on-water control means 20 is determined as a control region X.

A no-cable autonomous unmanned type vehicle (AUV: Autonomous Underwater Vehicle) which autonomously cruises in water without using a cable for connecting with the on-water control means 20 is used as the underwater vehicle 30. The on-water control means 20 controls a multiple underwater vehicles 30 using acoustic signals.

Therefore, it is unnecessary to provide the on-water control means 20 with a equipment for cable, a cable is not entangled or movement of the on-water control means 20 is not limited by the cable.

FIG. 1 shews a case where the multiple underwater vehicles 30 are one first underwater vehicle 30A and two second underwater vehicles 30B. Each of the first underwater vehicle 30A and the second underwater vehicles 30B is provided with cruising means (submerging means) 31 such as a rudder, a propulsion unit and a ballast (weight), and by the cruising means 31, the underwater vehicle can cruise underwater and can be submerged. The underwater vehicle 30 is provided with own vehicle positioning means 32 used for measuring a position of an own vehicle, communication means 33 used for bidirectional communication with the on-water control means 20 by acoustic signals, and an acoustic transponder (not shown) for responding a signal transmitted from the acoustic positioning means 24 of the on-water control means 20. The communication means 33 includes a transmitter for sending acoustic wave, and a wave receiver for receiving acoustic wave. The underwater vehicle 30 can emergency surface and can be collected by the mother ship 10 when positioning of the on-water control means 20 fails predetermined times or when communication with the on-water control means 20 fails predetermined times.

Cruising speed of the hovering type first underwater vehicle 30A can be made slower than those of the second underwater vehicles 30B. The first underwater vehicle 30A includes a vertical thruster and a horizontal thruster, a free degree of movement of the first underwater vehicle 30A is higher than the second underwater vehicles 30B, and a position of the first underwater vehicle 30A can be held even in a place having water flow or the like. Therefore, the first underwater vehicle 30A mainly carries out a precise survey operation and the like near a water bottom. The first underwater vehicle 30A is provided with imaging means 41 for taking an image of a water bottom. The imaging means 41 is a camera including lighting for example.

Figure 2A:
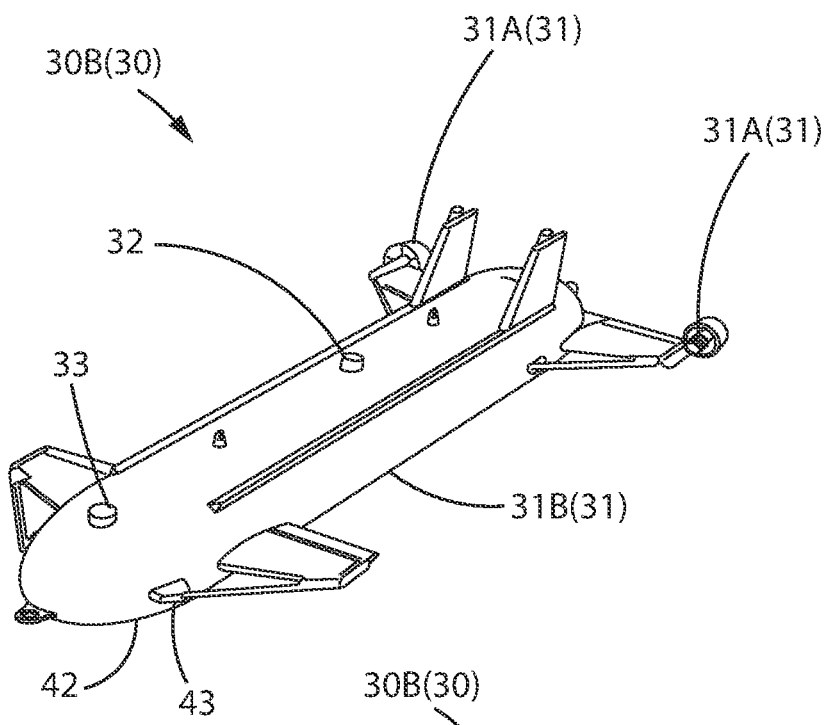
FIG. 2 are perspective views of an outward appearance of the underwater vehicle.
Figure 2B:
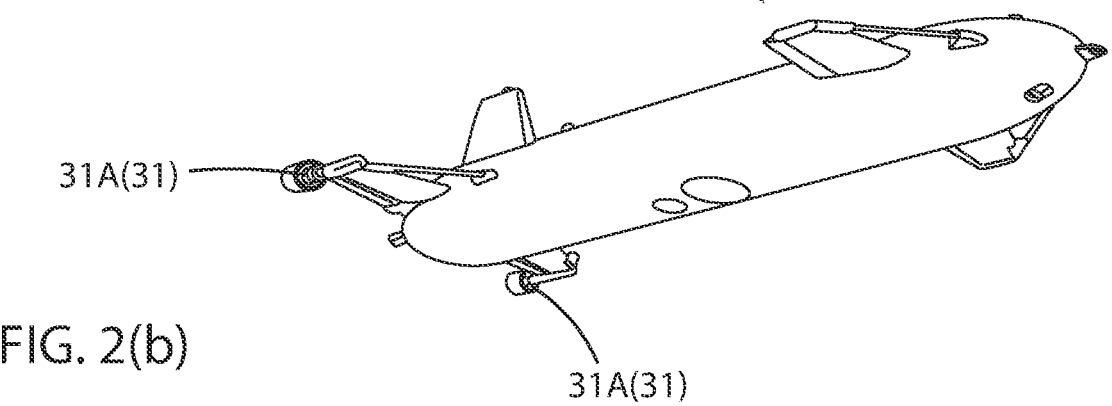

FIG. 2(a) is a perspective view of the second underwater vehicles 30B as viewed from a diagonally upward direction, and FIG. 2(b) perspective view of the second underwater vehicles 30B as viewed from a diagonally downward direction. The cruising type second underwater vehicles 30B can move agilely at high speed as compared with the first underwater vehicle 30A. Therefore, the second underwater vehicles 30B mainly carry out a survey operation and the like in a position separated away from a water bottom and in a wider range. Each of the second underwater vehicles 30B is provided with a land form researching means 42 for researching a land form of a water bottom and a geological layer researching means 43 for researching geological layer of water bottom. The land form researching means 42 and the geological layer researching means 43 are sonars for example. The second underwater vehicle 30B is provided at its rear portion with the propulsion unit 31A and at its lower portion with the ballast (weight) 31B as cruising means (submerging means) 31. The ballast 31B is mounted such that it can be separated away from the second underwater vehicle 30B.

Next, control of the on-water control means 20 will be described using FIGS. 3 and 4.

Figure 3:
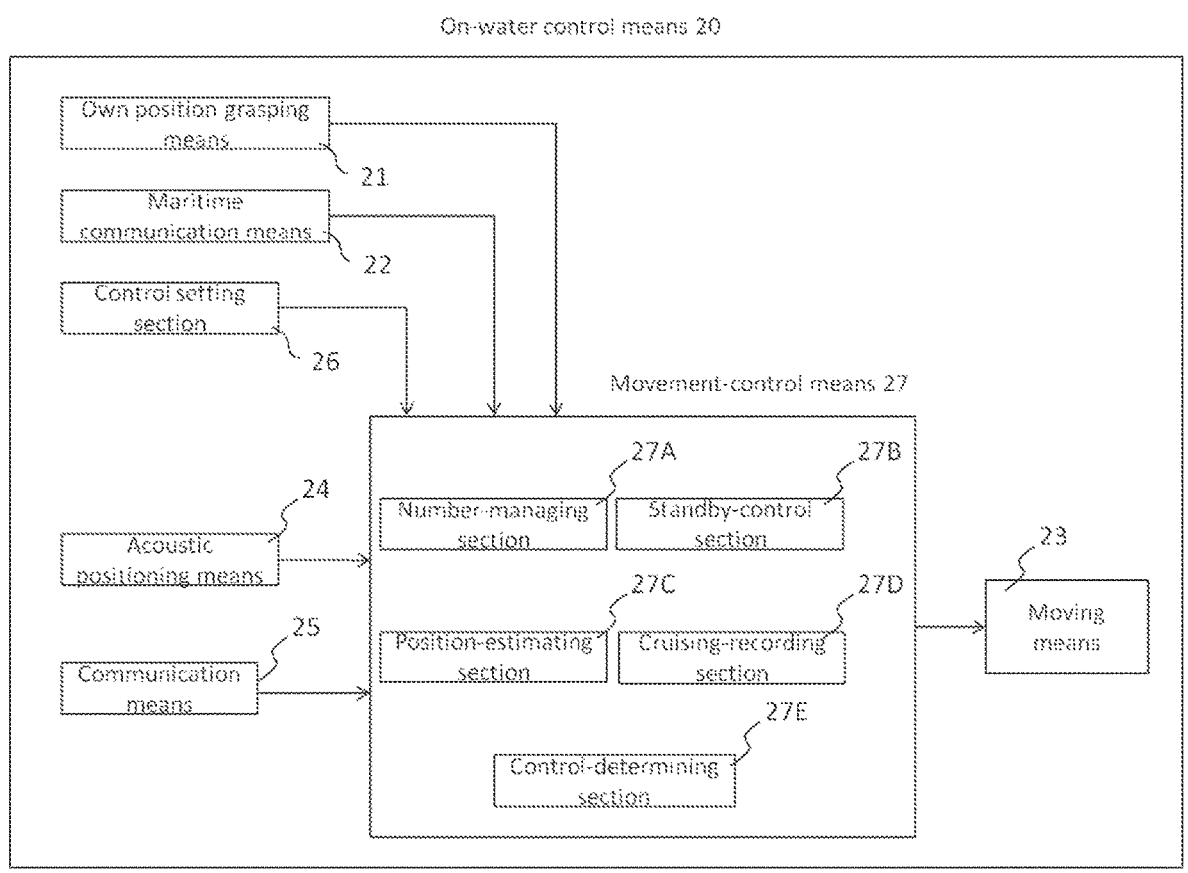
FIG. 3 is a control block diagram of on-water control means.
Figure 4:
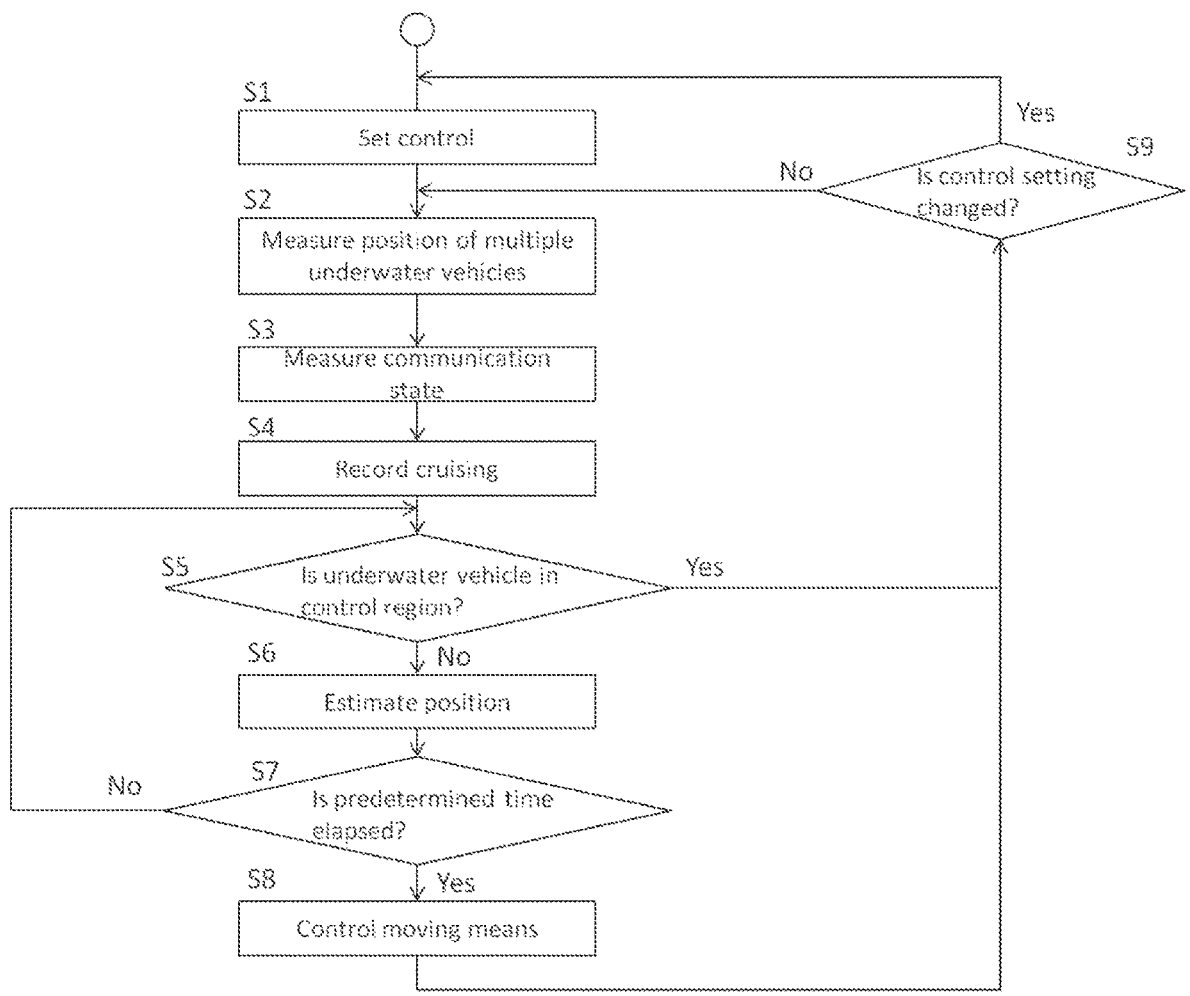
FIG. 4 is a control flow chart of the on-water control means.

FIG. 3 is a control block diagram of the on-water control means 20, and FIG. 4 is a control flow chart of the on-water control means 20.

The on-water control means 20 includes the own position grasping means 21, the maritime communication means 22, the moving means 23, the acoustic positioning means 24, the communication means 25, control setting section 26 and movement-control means 27.

The movement-control means 27 includes a number-managing section 27a, a standby-control section 27b, a position-estimating section 27c, a cruising-recording section 27D and a control-determining section 27E.

An operator who embarks on the mother ship 10 sets control by inputting, into the on-water control means 20, information which is necessary for the control such as a moving range of the on-water control means 20, the number, performance and depths of the underwater vehicles 30 which should be controlled using the control setting section 26 before the on-water control means 20 is made to launch into a research water area from the mother ship 10 (step 1).

After step 1, the on-water control means 20 which launched into the research water area starts the control of the underwater vehicle 30 which is introduced later in accordance with the control setting which was set in step 1. First, positions of the multiple underwater vehicles 30 are measured using the acoustic positioning means 24, and a measurement result is sent to the movement-control means 27 (step 2).

After step 2, communication states with the respective multiple underwater vehicles 30 are measured using the communication means 25, and the measurement result is sent to the movement-control means 27 (step 3). The communication state is grasped by a signal/noise ratio (S/N ratio) for example.

The movement-control means 27 records, in the cruising-recording section 27D, cruising paths of the multiple underwater vehicles 30 together with time based on the received measurement result in step 2 and the received measurement result in step 3 (step 4).

After step 4, the number-managing section 27A compares, with each other, the number of underwater vehicles 30 which are input in the control setting in step 1 and the number of underwater vehicle 30 in which the cruising paths are recorded in step 4, and the number-managing section 27A determines whether all of the underwater vehicles 30 which should be controlled are located in the control region X (step 5).

In step 5, when it is determined that the number of the underwater vehicles 30 in which the cruising paths are recorded is equal to or larger than the number of the underwater vehicles 30 which should be controlled, i.e., when it is determined that all of the underwater vehicles 30 which should be controlled are located in the control region X, this result is sent to the control-determining section 27E.

In this case, the movement-control means 27 predicts behaviors of the multiple underwater vehicles 30 based on the cruising paths recorded in the cruising-recording section 27D, and based on this prediction result, control may be performed to move the on-water control means 20 such that the underwater vehicles 30 do not deviate from the control region X. According to this, it is possible to prevent the underwater vehicles 30 from deviating from the control region X.

When moving the on-water control means 20, it is preferable that the on-water control means 20 is moved in a range where the number of the multiple underwater vehicles 30 located in the control region X when the movement is started is not reduced. According to this, it is possible to prevent the number of the underwater vehicles 30 located in the control region X from being reduced.

In step 5, when it is determined that the number of the underwater vehicles 30 in which the cruising paths are recorded is smaller than the number of the underwater vehicles 30 which should be controlled, i.e., when it is determined that one or some or all of the underwater vehicles 30 which should be controlled deviate from the control region X, the position-estimating section 27C estimates a direction in which an underwater vehicle 30 which deviates from the control region X exists based on the cruising paths of the underwater vehicles 30 recorded in the cruising-recording section 27D (step 6).

After step 6, the standby-control section 27B determines whether predetermined time is elapsed after it is first detected that an underwater vehicle 30 deviates from the control region X in step 5 (step 7).

When it is determined in step 7 that the predetermined time is not elapsed, the procedure returns to step 5, and it is again determined whether all of the underwater vehicles 30 which should be controlled are located in the control region X.

If it is determined in step 7 that the predetermined time is elapsed, the standby-control section 27B sends a determination result of step 5 to the control-determining section 27E, and instructs to start moving the on-water control means 20 (step 8). According to this, the moving means 23 operates and the on-water control means 20 is moved.

Even when it is determined that one or some or all of the underwater vehicles 30 which should be controlled deviate from the control region X, there are a possibility that an underwater vehicle 30 which deviates from the control region X returns into the control region X by itself and a possibility that although an underwater vehicle is actually located in the control region X, it is erroneously detected that the underwater vehicle deviates from the control region X by temporal positioning or communication failure. Therefore, it is possible to lower a possibility that the on-water control means 20 unnecessarily moves by keeping, before moving the on-water control means 20, the on-water control means 20 on standby for predetermined time after it is detected that the underwater vehicle 30 deviates from the control region X, and by repeating the determination of step 5 predetermined times during that time as in this embodiment. According to this, it is possible to prevent consumption of energy of the on-water control means 20 and prevent the underwater vehicle 30 located in the control region X from deviating from the control region X.

The position-estimating section 27C estimates a direction in which an underwater vehicle 30 which deviates from the control region X exists based on the cruising paths of the underwater vehicles 30 recorded in the cruising-recording section 27D, and the movement-control means 27 controls the moving means 23 based on this estimation result. According to this, it is possible to enhance the control precision and moving efficiency of the on-water control means 20, and an underwater vehicle 30 which deviates from the control region X can be returned to the control region X faster.

When the movement-control means 27 moves the on-water control means 20, it is preferable to control the moving means 23 such that the on-water control means 20 is moved to a position where all of the multiple underwater vehicles 30 can be controlled. According to this, since all of the underwater vehicles 30 can be placed under control of the on-water control means 20, the survey operation and the like can be carried out more safely and efficiently.

When all of the multiple underwater vehicles 30 cannot be controlled, it is preferable that the movement-control means 27 controls the moving means 23 such that the on-water control means 20 moves to a position where the maximum number of the multiple underwater vehicles 30 can be controlled. According to this, the number of underwater vehicles 30 which deviate from the control region X can be minimized. In this case, it is preferable that the maximum number is obtained by subtracting, from the number of multiple underwater vehicles 30, the number of uncontrollable underwater vehicles 30 including any of an underwater vehicle 30 which deviates from the control region X, a damaged underwater vehicle 30, and a surfaced underwater vehicle 30. According to this, a multiple underwater vehicles 30 which can research can be located in the control region X and the survey operation and the like can be continued.

There is a tendency that if frequency is high, acoustic signals are concentrated, and if frequency is low, acoustic signals are enlarged. Therefore, it is possible to change the control region X by changing acoustic frequency of the acoustic positioning means 24 or the communication means 25. It is also possible to change the control region X by changing a transmitting direction of acoustic signals. It is preferable that frequency bands of the acoustic positioning means 24 and the communication means 25 are changed to avoid interference of acoustic frequencies thereof.

When the on-water control means 20 controls a multiple underwater vehicles 30 such that they are located in the control region X, it is possible to control the movement of the on-water control means 20 by the moving means 23. In addition to this, it is also possible to change the acoustic frequency or change the transmitting direction to control the control region X. It is also possible to control variable frequency to continuously change the acoustic frequency, and widen the control region X, and precisely carryout acoustic positioning and communication. When deviation of the underwater vehicle 30 from the control region X is very slight, it is also possible to cope with the deviation by these methods.

The control-determining section 27E determines whether control setting should be changed based on a determination result sent from the number-managing section 27A or the standby-control section 27B (step 9).

In step 9, when the determination result is received from the number-managing section 27A and when the number of the underwater vehicles 30 which should be controlled and the number of the underwater vehicles 30 in which the cruising paths thereof are recorded are the same, the control setting is not changed and the procedure proceeds to step 2.

Further, when the determination result is received from the number-managing section 27A and when the number of the underwater vehicles 30 in which the cruising paths thereof are recorded is larger than the number of the underwater vehicles 30 which should be controlled, the procedure proceeds to step 1, and the control setting section 26 changes the control setting to setting including the underwater vehicle 30 which returns to the control region X. According to this, control can be continued including the underwater vehicle 30 which returns to the control region X.

When the determination result is received from the standby-control section 27B, i.e., when a determination result indicating that there is an underwater vehicle 30 which deviates from the control region X is received, the procedure proceeds to step 1, and the control setting section 26 changes the control setting to setting excluding the underwater vehicle 30 which deviates from the control region X. According to this, control can be continued excluding the underwater vehicle 30 which deviates from the control region X.

As described above, according to the embodiment, by including the number-managing section 27A which manages the number of the multiple underwater vehicles 30, it is possible to control the movement of the on-water control means 20 based on the number of the underwater vehicles 30.

Since the on-water control means 20 moves the multiple underwater vehicles 30 to positions where they can be positioned, it is possible to locate the multiple underwater vehicles 30 in the control region X and continue the survey operation and the like.

By moving the on-water control means 20 to a position where communication with the multiple underwater vehicles 30 can be established, it is possible to carry out the survey operation and the like more safely and efficiently.

According to these, it is possible to research a wide water area safely and efficiently without losing sight of a multiple underwater vehicles 30.

In control of the underwater vehicles 30, the mother ship 10 can include the function of the on-water control means 20, and the mother ship 10 can perform the function of the on-water control means 20.

Next, the introducing/recovering equipment of the control system of the underwater vehicle 30 will be described using FIGS. 5 to 7.

Figure 5:
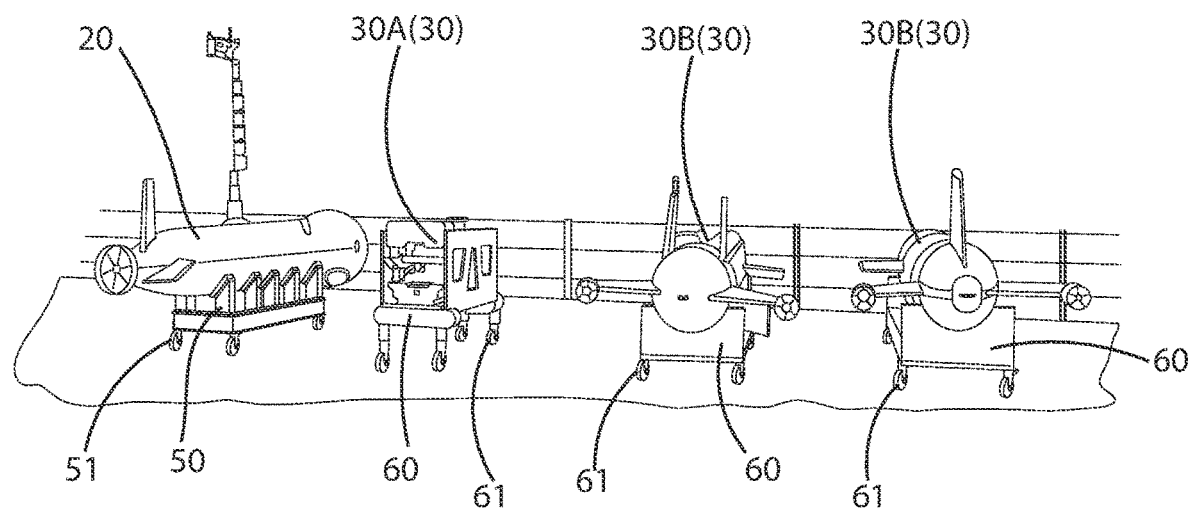
FIG. 5 is a diagram showing a placed state of the on-water control means and a multiple underwater vehicles.
Figure 6:
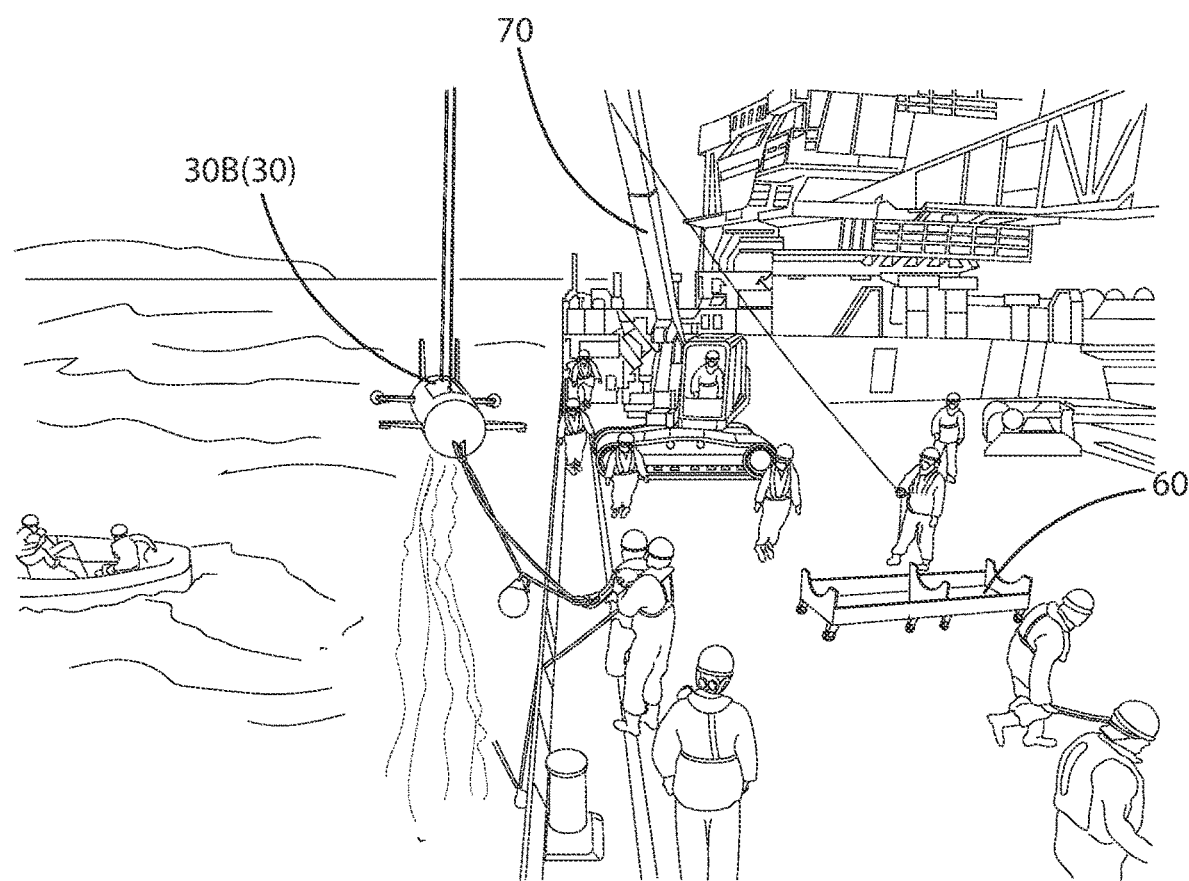
FIG. 6 is a diagram showing a recovering operation of the underwater vehicle.

FIG. 5 is a diagram showing a placed state of the on-water control means 20 and a multiple underwater vehicles 30, and FIG. 6 is a diagram showing a recovering operation of the underwater vehicle 30.

The introducing/recovering equipment of the embodiment is placed on the mother ship 10. The mother ship 10 is not a dedicated ship provided with a dedicated equipment for the introducing/recovering operation of the control system of the underwater vehicle 30, but the mother ship 10 is a general ship.

As shown in FIG. 5, the introducing/recovering equipment includes an on-water control means-pedestal 50 on which the on-water control means 20 is placed, and underwater vehicle-pedestals 60 on which underwater vehicles 30 are placed. A lower portion of the on-water control means-pedestal 50 is provided with interchanging means 51, and lower portions of the underwater vehicle-pedestals 60 are provided with interchanging means 61.

As shown in FIG. 6, the introducing/recovering equipment also includes an introducing/recovering equipment 70. The introducing/recovering equipment 70 is a equipment including a crane which can be mounted or placed on a general ship. The introducing/recovering equipment 70 has a function to launch and recover the on-water control means 20, and a function to introduce and recover the underwater vehicles 30. According to this, it is possible to launch, introduce and recover the on-water control means 20 and the underwater vehicles 30 using the same equipment. Since a general ship can be used as the mother ship 10, the survey operation and the like can be carried out without being swayed by schedule of the dedicated ship.

In this embodiment, the interchanging means 51 and 61 are casters. A position of the on-water control means-pedestal 50 and a position of the underwater vehicle-pedestals 60 with respect to the introducing/recovering equipment 70 can be interchanged by the interchanging means 51 and 61 in accordance with introducing/recovering order of the on-water control means 20 and the underwater vehicles 30. According to this, the on-water control means 20 and the multiple underwater vehicles 30 can stably be placed and interchanged. Therefore, the introducing and recovering operations can smoothly be carried out.

FIG. 6 shows a state where the underwater vehicle-pedestals 60 are placed at a predetermined position on the mother ship 10 when the recovering operation of the second underwater vehicle 30B is carried out.

The interchanging means 51 and the 61 may be robot arms, conveyers or the like which move the on-water control means-pedestal 50 and the underwater vehicle-pedestals 60 and interchange the positional relation with respect to the introducing/recovering equipment 70.

Figure 7:
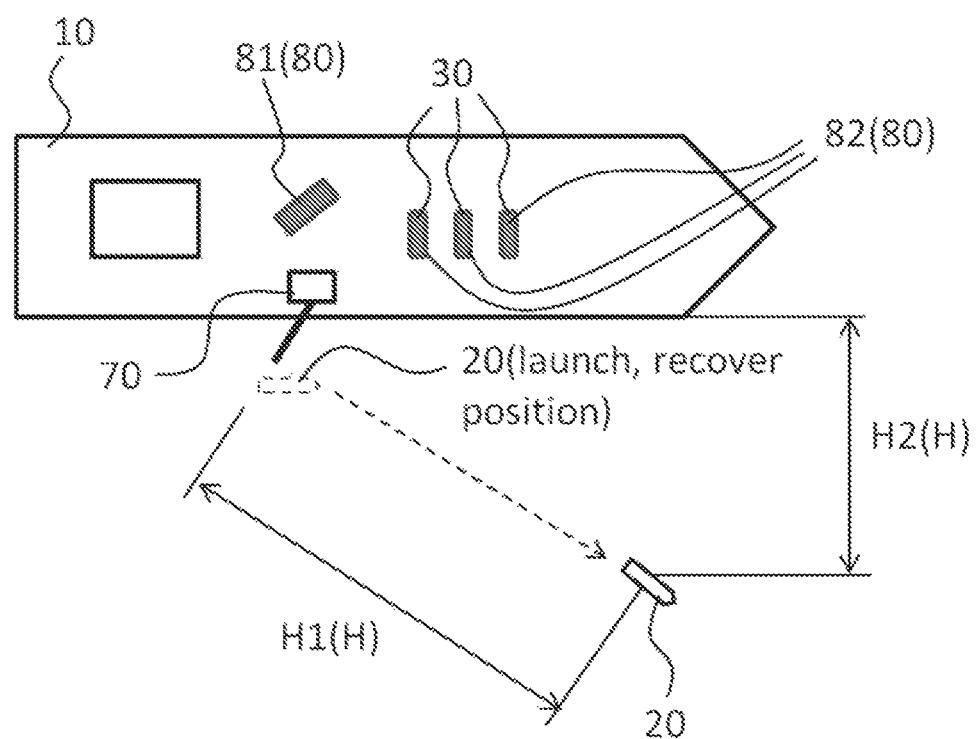
FIG. 7 is a schematic configuration diagram of an introducing/recovering equipment.

FIG. 7 is a schematic configuration diagram of the introducing/recovering equipment.

The introducing/recovering equipment includes display means 80. The display means 80 display introducing order or recovering order of the underwater vehicles 30. The display means 80 are an electric scoreboard, a screen of a personal computer or numbers allocated to the underwater vehicles 30. In this embodiment, the display means 80 are an electric scoreboard 81 provided at a position which can visually be identified by an operation commander which carries out the introducing/recovering operation, and identification numbers 82 allocated to the underwater vehicles 30. By including the display means 80, it is possible to prevent an error of the introducing order or the recovering order of the multiple underwater vehicles 30, and enhance the efficiency and safety of the operation.

When the multiple underwater vehicles 30 are introduced from the mother ship 10, the on-water control means 20 is made to launch before the multiple underwater vehicles 30 are introduced from the mother ship 10. By introducing the underwater vehicles 30 after the on-water control means 20 is made to launch, it is possible to swiftly start the control of the underwater vehicles 30 by the on-water control means 20 after the underwater vehicles 30 are introduced. Further, by first launching the on-water control means 20 which is larger than the underwater vehicles 30 in size, it is possible to widely secure operation spaces of the multiple underwater vehicles 30 on the mother ship 10. According to this, efficiency and safety of the introducing operation are enhanced.

The on-water control means 20 which launches first and which is larger, in size, than the underwater vehicle 30 moves such that the on-water control means 20 separates from the mother ship 10 by a predetermined distance H after the on-water control means 20 launches. The predetermined distance H is within a range where an underwater vehicle 30 which is introduced later does not collide and the introducing operation is not hindered and a multiple underwater vehicles 30 which are introduced later can be controlled. According to this, efficiency and safety of the introducing operation are further enhanced. The predetermined distance H may be set as a predetermined distance H1 from an introduced position of the underwater vehicle 30 or may be set as a predetermined distance H2 from a side surface of the ship.

It is preferable that the introducing order of the multiple underwater vehicles 30 is determined while taking, into account, at least one of settling speed and submerging speed of the underwater vehicle 30.

For example, by first introducing the first underwater vehicle 30A having the settling speed and the submerging speed which are slower than those of the second underwater vehicle 30B and having larger exploration depth than that of the second underwater vehicle 30B, time elapsed until the research is started can be shortened, and efficiency of the entire survey operation can be enhanced. Further, by setting the introducing order while taking, into account, a difference of the settling speed and the submerging speed between the underwater vehicles 30, it is possible to prevent the introduced underwater vehicles 30 from colliding against each other, and the safety is enhanced.

It is preferable that exploration depths of a multiple underwater vehicles 30 are set in the underwater vehicles 30 on the mother ship 10, and the exploration depths set in the underwater vehicles 30 are input to the on-water control means 20. According to this, in the preset exploration depths, the multiple underwater vehicles 30 can carry out the survey operation and the like while receiving control of the on-water control means 20. Further, the exploration depths can be input on the mother ship 10 where a wide operation space can be secured without touching water.

Other than the exploration depths, it is also possible to set as an exploration condition by inputting information which is necessary for the exploration such as exploration mission, an exploration region and a cruising path.

When a multiple underwater vehicles 30 are recovered in the mother ship 10, the on-water control means 20 is recovered after the multiple underwater vehicles 30 are sequentially recovered from water. Lastly, by recovering the on-water control means 20, the recovering operation can be carried out while grasping positions of the underwater vehicles 30 and the communication state by the on-water control means 20. According to this, efficiency and safety of the recovering operation are enhanced.

While the on-water control means 20 recovers the multiple underwater vehicles 30, the on-water control means 20 is kept on standby at a position separated from the mother ship 10 by the predetermined distance H. The predetermined distance H is within a range where a surfacing underwater vehicle 30 does not collide and the recovering operation of the underwater vehicles 30 is not hindered and an underwater vehicle 30 which is not recovered can be controlled. According to this, efficiency and safety of the recovering operation are further enhanced. The predetermined distance H may be set as a predetermined distance H1 from a recovered position of the underwater vehicle 30 or may be set as a predetermined distance H2 from a side surface of the ship.

It is preferable that the recovering order of the multiple underwater vehicles 30 is the surfaced order. By recovering in the surfaced order, it is possible to prevent a later surfaced underwater vehicle 30 from colliding against a faster surfaced underwater vehicle 30. Further, it is possible to prevent a surfaced underwater vehicle 30 from being carried away by water and prevent sight thereof from being lost.

It is preferable that the on-water control means 20 controls the multiple underwater vehicles 30 at a position separated away from the mother ship 10 by the predetermined distance H until the recovering operation of the underwater vehicles 30 is completed. By continuing the control of the underwater vehicles 30 by the on-water control means 20 until all of the underwater vehicles 30 are recovered, efficiency and safety of the recovering operation are enhanced.

Next, control of the underwater vehicles 30 will be described using FIGS. 8 and 9.

Figure 8:
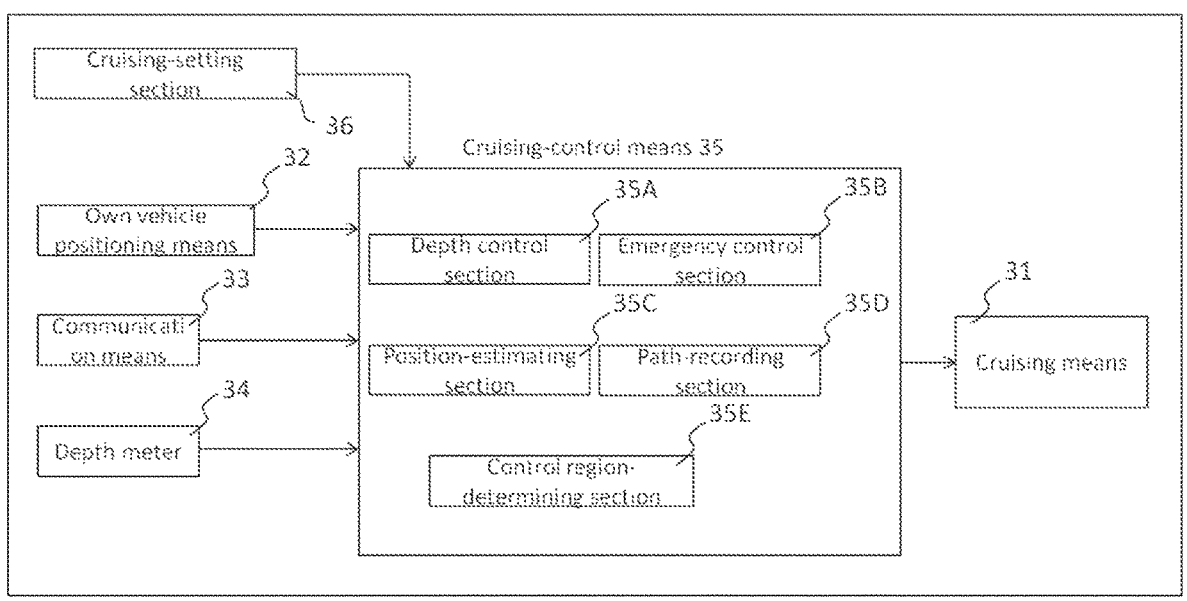
FIG. 8 is a control block diagram of the underwater vehicle.
Figure 9:
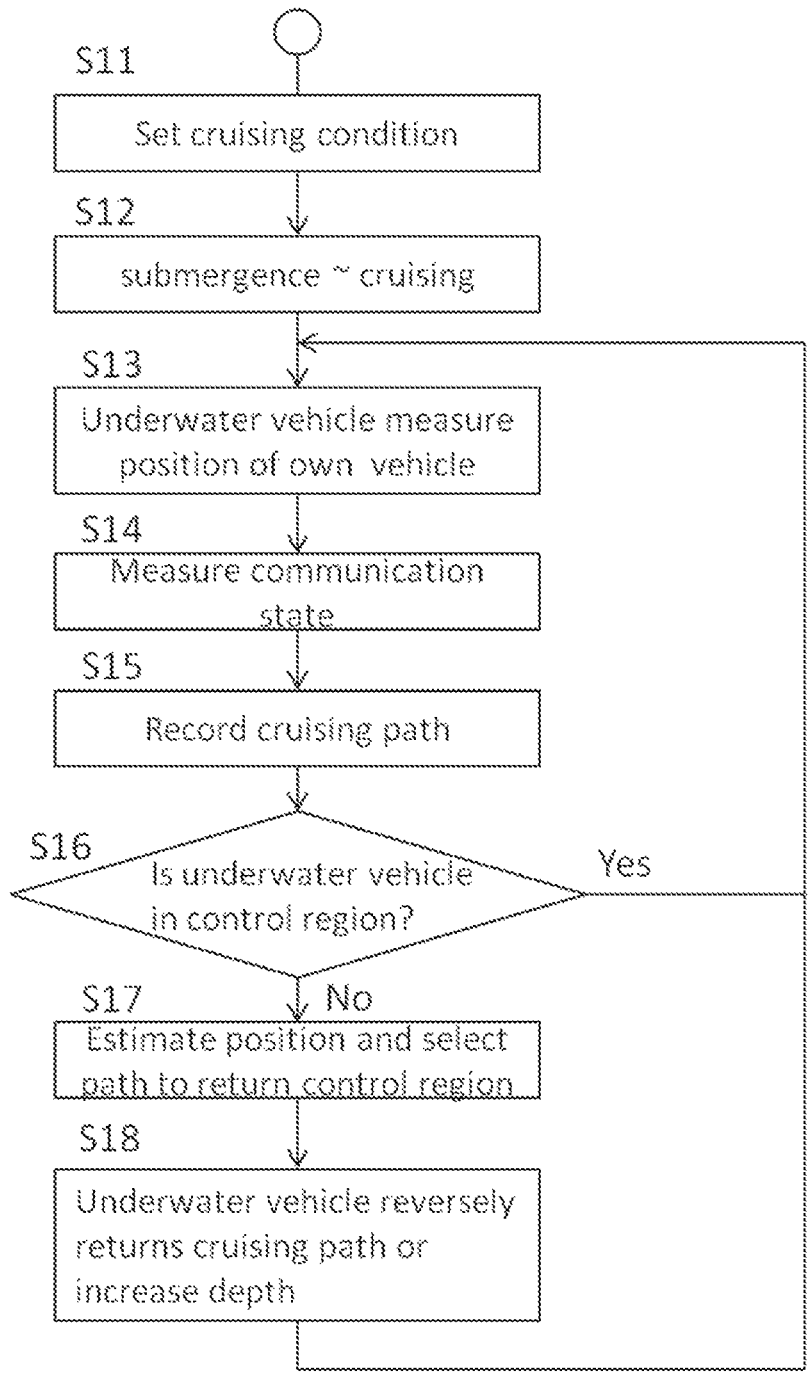
FIG. 9 is a control flow chart of the underwater vehicle.

FIG. 8 is a control block diagram of the underwater vehicle 30, and FIG. 9 is a control flow chart of the underwater vehicle 30.

The underwater vehicle 30 includes the cruising means 31, the own vehicle positioning means 32, the communication means 33, a depth meter 34, cruising-control means 35 and a cruising-setting section 36.

The cruising-control means 35 includes a depth control section 35A, an emergency control section 353, a position-estimating section 35C, a path-recording section 35D, a control region-determining section 35E.

An operator who embarks on the mother ship 10 sets cruising conditions by inputting, into the underwater vehicles 30, information which is necessary for the research such as a researching range, a researching target and the like of the underwater vehicles 30 using the cruising-setting section 36 before the underwater vehicles 30 are introduced from the mother ship 10 into the research water area (step 11).

After step 11, the multiple underwater vehicles 30 which are introduced into the research water area start submergence and cruising in accordance with the cruising conditions which are set in step 11 (step 12).

After step 12, the underwater vehicles 30 measure positions of the own vehicles using the own vehicle positioning means 32, and send the positions to the cruising-control means 35 (step 13). The positions of the own vehicles are measured by placing a speed sensor and a gyroscope sensor, and detecting and calculating speed and acceleration of the own vehicles.

After step 13, the communication state with respect to the on-water control means 20 is measured using the communication means 33, and a measurement result is sent to the cruising-control means 35 (step 14). The communication state is grasped by a signal/noise ratio (S/N ratio) for example.

The cruising-control means 35 records the cruising path of the own vehicle together with time in the path-recording section 35D based on the received measurement result in step 13 and the received measurement result in step 14 (step 15).

The underwater vehicle 30 communicates with the on-water control means 20 using the communication means 33, passes a position of the own vehicle measured in step 13 to the on-water control means 20, and the on-water control means 20 complementarily puts a position obtained by the underwater vehicle 30 to use for positional estimation, control determination or movement control in the movement-control means 27.

After step 15, the control region-determining section 35E determines whether the own vehicle is in the control region X based on the cruising path which is recorded in the path-recording section 35D (step 16).

If it is determined in step 16 that the own vehicle is in the control region X, the procedure returns to step 13.

If it is determined in step 16 that the own vehicle is not in the control region X, the position-estimating section 35C estimates a position of the own vehicle based on a measurement result made by the own vehicle positioning means 32, a measurement result made by the depth meter 34 and the cruising path recorded in the path-recording section 35D, and the position-estimating section 35C selects a path to return to the control region X (step 17).

In step 17, if the underwater vehicle 30 reversely cruises the recorded cruising path and selects the path to return to the control region X, the emergency control section 35B controls the cruising means 31 such that the cruising means 31 reversely returns the path through which the underwater vehicle cruised heretofore. Since the control region X spreads in the form of an umbrella, if the depth is increased and the path to return to the control region X is selected, the depth control section 35A controls the cruising means 31 such that the depth of the own vehicle is increased (step 18). According to this, the underwater vehicle 30 can returns to the control region X by itself, and the operation can be continued while again receiving the control of the on-water control means 20.

Next, another example of the control of the underwater vehicle 30 will be described using FIGS. 10 and 11.

Figure 10:
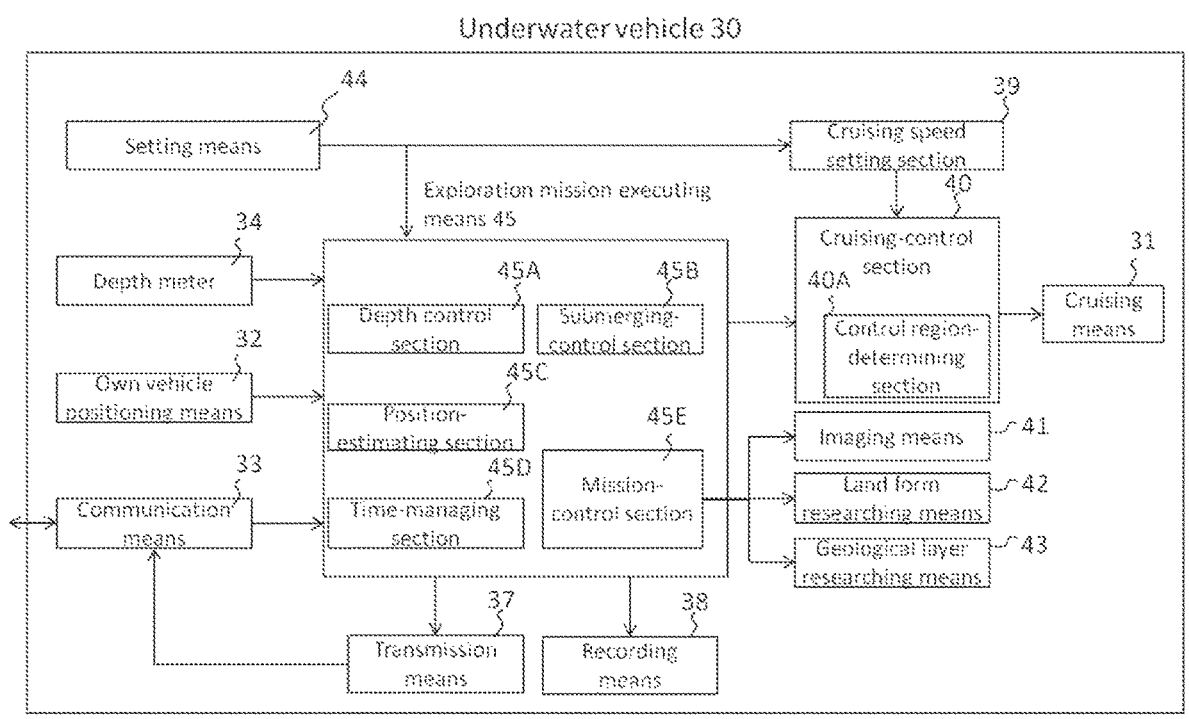
FIG. 10 is a control block diagram of another example of the underwater vehicle.
Figure 11:
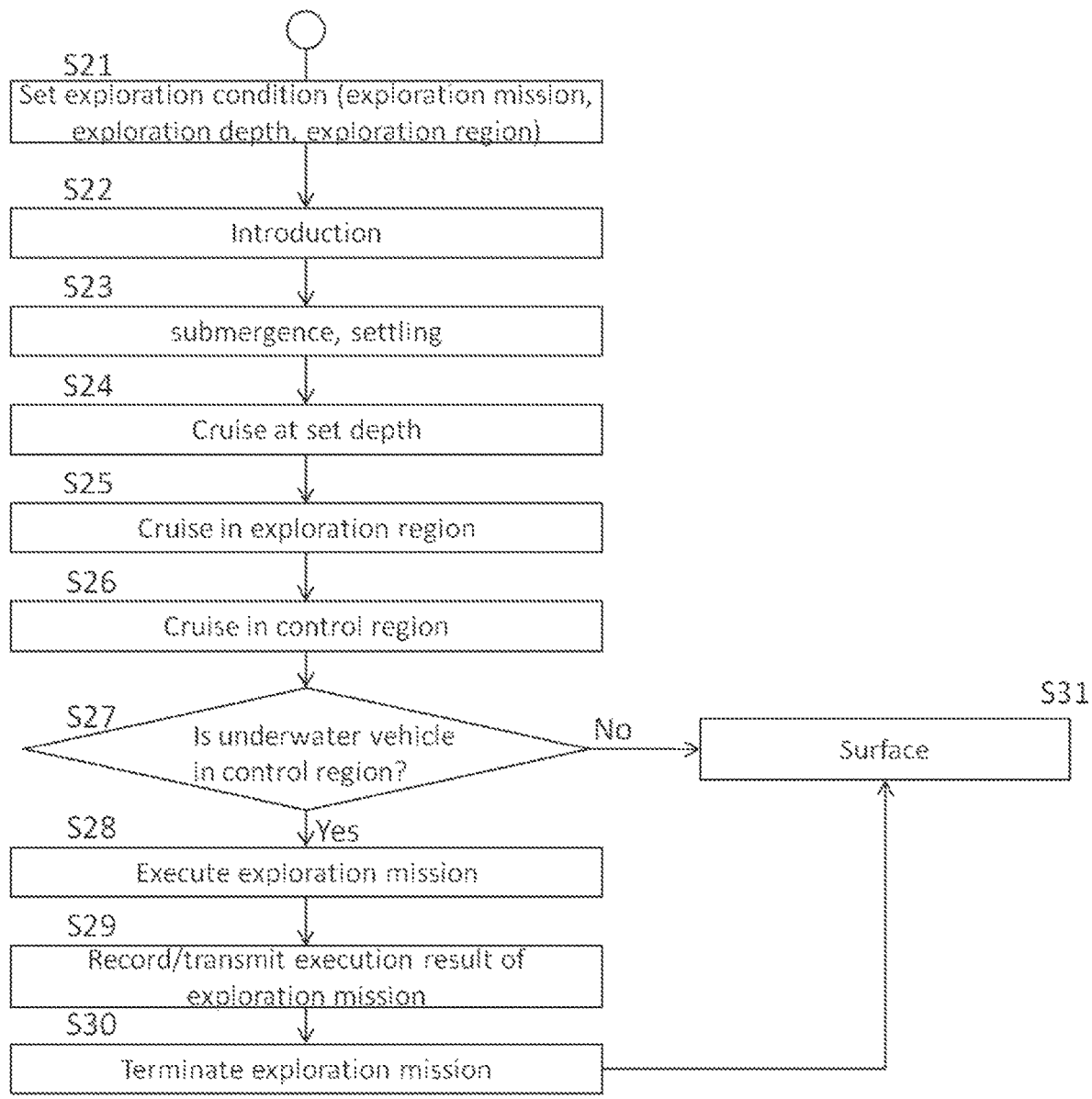
FIG. 11 is a control flow chart of the other example of the underwater vehicle.

FIG. 10 is a control block diagram of another example of the underwater vehicle 30, and FIG. 11 is a control flow chart of the other example of the underwater vehicle 30.

The underwater vehicle 30 includes the cruising means 31, the own vehicle positioning means 32, the communication means 33, the depth meter 34, transmission means 37, recording means 38, a cruising speed setting section 39, a cruising-control section 40, imaging means 41, land form researching means 42, the geological layer researching means 43, setting means 44 arid exploration mission executing means 45.

The exploration mission executing means 45 includes a depth control section 45A, a submerging-control section 45B, a position-estimating section 45C, a time-managing section 45D, a mission-control section 45E.

The cruising-control section 40 includes a control region-determining section 40A.

An operator who embarks on the mother ship 10 inputs, to the underwater vehicle 30, information which is necessary for exploration such as an exploration mission, an exploration depth, an exploration region and a cruising path of the underwater vehicle 30 using the setting means 44 before the underwater vehicle 30 is introduced into an exploration water area from the mother ship 10, thereby setting exploration conditions, and cruising speed is set for the underwater vehicle 30 using the cruising speed setting section 39 (step 21). The exploration missions, the exploration depths, the exploration regions and the cruising paths are set differently between the underwater vehicles 30.

The exploration condition such as the set exploration depth and the cruising speed are input to the on-water control means 20.

In the set respective exploration depths, it is preferable that the exploration region is set such that the multiple underwater vehicles 30 have respect exploration regions. According to this, it is possible to carry out the exploration more efficiently.

It is preferable that the cruising path is set such that the cruising loca of the underwater vehicles 30 which cruise respective exploration regions are not superposed on each other simultaneously. According to this, it is possible to prevent underwater vehicles 30 having close exploration depths from colliding against each other, and safety can be enhanced. Further, since the underwater vehicles 30 are not vertically superposed on each other, it is possible to lower a possibility that the underwater vehicle 30 erroneously observes and a possibility the underwater vehicle 30 cannot observe.

Further, it is preferable that the exploration depths which are set differently between the underwater vehicles 30 include deep exploration depths which are close to the water bottom and shallow exploration depths which are far from the water bottom, the deep exploration depths have height (distance) from the water bottom in a range of 1 m or more and less than 50 m, and the shallow exploration depths have height (distance) from the water bottom in a range of 10 m or more and less than 200 m. According to this, it is possible to efficiently explore a region close to the water bottom and a region far from the water bottom. In this embodiment, the hovering type first underwater vehicle 30A explores a deep exploration depth region, and the cruising type second underwater vehicle 30B explores a shallow exploration depth region. Since the cruising speed of the first underwater vehicle 30A is slower than that of the second underwater vehicle 30B, it is possible to explore more precisely near the water bottom.

After step 21, the multiple underwater vehicles 30 are introduced into underwater in accordance with the introducing order (step 22).

The on-water control means 20 which is launched first starts control of the introduced underwater vehicle 30.

After step 22, the multiple underwater vehicles 30 starts the submergence and settling (step 23).

The submergence is carried out using the propulsion unit 31A and the ballast 31B, and the settling is carried out only by weight of the ballast 31B while stopping the propulsion unit 31A.

When the submergence and settling are carried out, the multiple underwater vehicles 30 measure depths and positions of the own vehicles using the depth meter 34 and the own vehicle positioning means 32, and the exploration mission executing means 45 having the depth control section 45A, the submerging-control section 45B and the position-estimating section 45C controls the cruising-control section 40 in accordance with the exploration depth which is set in step 21. The cruising-control section 40 controls the cruising means 31 in accordance with the control performed by the exploration mission executing means 45 and the cruising speed which is set by the cruising speed setting section 39.

The measurement of the position of the own vehicle carried out by the own vehicle positioning means 32 is carried out by mounting the speed sensor and the gyroscope sensor for example, and detecting and calculating the speed and the acceleration of the own vehicle.

After step 23, the underwater vehicle 30 which reaches the set exploration depth starts cruising (step 24).

The respective underwater vehicles 30 which start cruising at the set exploration depths measure positions of the own vehicles using the own vehicle positioning means 32, and send measurement results to the exploration mission executing means 45. The exploration mission executing means 45 which includes the position-estimating section 45C controls the cruising-control section 40 such that the underwater vehicle 30 cruises in the exploration region which is set in step 21. The cruising-control section 40 controls the cruising means 31 in accordance with the control carried out by the exploration mission executing means 45 and the cruising speed which is set by the cruising speed setting section 39. According to this, the underwater vehicle 30 cruises in the exploration region (step 25).

The exploration mission executing means 45 having the time-managing section 45D which manages time controls the cruising-control section 40 in accordance with the cruising path which is set in step 1 such that the cruising loca of the underwater vehicles 30 are not superposed on each other simultaneously.

The cruising-control section 40 cruises in the control region X of the on-water control means 20 based on an estimated position of the own vehicle received from the exploration mission executing means 45, a depth and a communication state with respect to the on-water control means 20 (step 26). The communication state is grasped by the signal/noise ratio (S/N ratio) for example.

The cruising-control section 40 includes the control region-determining section 40A, and periodically determines whether the own vehicle is located in the control region X (step 27) based on the estimated position of the own vehicle and the communication state with the on-water control means 20.

If it is determined in step 27 that the own vehicle is located in the control region X, the exploration mission is executed (step 26).

If the mission-control section 45E of the exploration mission executing means 45 controls the imaging means 41 provided in the first underwater vehicle 30A, it is possible to take an image of the water bottom. If the mission-control section 45E controls the land form researching means 42 and the geological layer researching means 43 provided in the second underwater vehicle 30B, it is possible to obtain information of the land form of the water bottom and the geological layer under the water bottom.

Exploration mission execution results such as information of the obtained taken images, a land form of the water bottom and the geological layer under the water bottom are recorded in the recording means 38 such as a hard disk and a magnetic tape. After the results are subjected to processing such as encoding by the transmission means 37, the results are sent to the on-water control means 20 using the communication means 33 (step 29).

After step 29, if the exploration mission executing means 45 determines that the set exploration mission is completed, the exploration mission is terminated (step 30), and the own vehicle is made to surface (step 31).

If it is determined in step 27 that the own vehicle is not located in the control region X, the exploration mission executing means determines that exploration cannot be continued, and the own vehicle is made to surface (step 31).

Before the own vehicle is made to surface, a position of the own vehicle is estimated by the position-estimating section 45C based on measurement results made by the own vehicle positioning means 32, it is determined whether the own vehicle can return to the control region X, and if it is determined that the own vehicle cannot return to the control region X, the own vehicle may be made to surface.

The exploration conditions such as the exploration depth which is set by the setting means 44 of the multiple underwater vehicles 30 are setting of the exploration conditions in the mother ship 10 and except this, instructions from the mother ship 10 can also be renewed automatically through the on-water control means 20 or based on a schedule which is programed in the on-water control means 20.

INDUSTRIAL APPLICABILITY

The control method of the underwater vehicle, the introducing method of the underwater vehicle, the recovering method of the underwater vehicle, the control system of the underwater vehicle, and the introducing/recovering equipment of the control system of the underwater vehicle according to the present invention can deploy and operate the multiple underwater vehicles in the research water area, and the survey operation and the like such as the water bottom exploration can safely and efficiently be carried out.

EXPLANATION OF SYMBOLS 10 mother ship
20 on-water control means
23 moving means
24 acoustic positioning means
25 communication means
27 movement-control means
27A number-managing section
27B standby-control section
27D cruising-recording section 30 underwater vehicle
33 communication means
35 cruising-control means
44 setting means
50 on-water control means-pedestal
51 interchanging means
60 underwater vehicle-pedestal
61 interchanging means
70 introducing/recovering equipment
80 display means
H predetermined distance
X control region

The invention claimed is:

1. A control method of underwater vehicle wherein when on- water control means having moving means and capable of moving near a water surface controls a multiple underwater vehicles which cruise underwater, the moving means controls movement of the on-water control means such that the multiple underwater vehicles are located in a control region where the on-water control means can carry out positioning the multiple underwater vehicles utilizing acoustic positioning means provided in the on-water control means,
wherein based on a measurement result which respective positions of the multiple underwater vehicles are measured using the acoustic positioning means and a measurement result which communication states with communication means which are respectively provided in the on-water control means and the multiple underwater vehicles, respective cruising paths of the multiple underwater vehicles together with time are recorded in a cruising-recording section provided in the on-water control means,
when an underwater vehicle deviates from the control region, based on the time and cruising paths recorded in the cruising-recording section, it is estimated a direction that the underwater vehicle which deviated from the control region exists, and the on-water control means is moved in the direction in which it is estimated that the underwater vehicle exists.

2. A control system of underwater vehicle comprising on-water control means having moving means and capable of cruising near a water surface, a multiple underwater vehicles which cruise in water, and communication means provided in the on-water control means and the multiple underwater vehicles respectively, further the on-water control means includes acoustic positioning: means which measures respective positions of the multiple underwater vehicles, a movement-control means which controls movement of the on-water control means by the moving means such that the multiple underwater vehicles are located in a control region where the on-water control means can carry out positioning the multiple underwater vehicles by the acoustic positioning means, and a cruising-recording section which records cruising of the multiple underwater vehicles,
wherein the movement-control means records, in the cruising-recording section, respective cruising paths of the multiple underwater vehicles together with time based on a measurement result which respective positions of the multiple underwater vehicles are measured using the acoustic positioning means and a measurement result which communication states with the communication means,
when an underwater vehicle deviates from the control region, based on the time and cruising paths recorded in the cruising-recording section, it is estimated a direction that the underwater vehicle which deviated from the control region exists, and the on-water control means is moved in the direction in which it is estimated that the underwater vehicle exists.

3. The control method of the underwater vehicle according to claim 1, wherein the on-water control means is moved to a position where the on-water control means can control all of the multiple underwater vehicles.

4. The control method of the underwater vehicle according to claim 1, wherein the on-water control means is moved to a position where the on-water control means can control maximum number of the multiple underwater vehicles.

5. The control method of the underwater vehicle according to claim 4, wherein the maximum number is a number obtained by subtracting, from the number of the multiple underwater vehicles, number of uncontrollable underwater vehicles including any of: the underwater vehicle which deviates from the control region; the damaged underwater vehicle; and the emergency surfaced underwater vehicle.

6. The control method of the underwater vehicle according to claim 1, wherein when the on-water control means is moved, the on-water control means is moved in a range where the number of the multiple underwater vehicles located in the control region when the movement is started is not reduced.

7. The control method of the underwater vehicle according to claim 1, wherein before the on-water control means is moved, if it is detected that the underwater vehicle deviates from the control region, the on-water control means keeps on standby for predetermined time and then, the on-water control means starts moving.

8. The control system of the underwater vehicle according to claim 2, wherein each of the underwater vehicles includes cruising-control means and own vehicle positioning means, when the cruising-control means detects that the underwater vehicle deviates from the control region, the cruising-control means estimates a position of the own vehicle by the own vehicle positioning means, and the cruising-control means makes the underwater vehicle return a path through which the underwater vehicle cruises heretofore or makes the underwater vehicle cruise in a direction in which a depth in the underwater is increased.

9. The control system of the underwater vehicle according to claim 2, wherein the movement-control means includes a standby-control section which instructs such that when it is detected that the underwater vehicle deviates from the control region, the on-water control means is kept on standby for predetermined time and then, the on-water control means starts moving.

10. The control method of the underwater vehicle according to claim 1, wherein when the underwater vehicle detects that it deviates from the control region, the underwater vehicle reversely returns a path through which the underwater vehicle cruises heretofore or the underwater vehicle cruises in a direction in which a depth in the underwater is increased.

11. An introducing method of underwater vehicle used for a control method of the underwater vehicle wherein when on-water control means having moving means and capable of moving near a water surface controls a multiple underwater vehicles which cruise underwater. the moving means controls movement of the on-water control means such that the multiple underwater vehicles are located in a control region where the on-water control means can carry out positioning the multiple underwater vehicles utilizing acoustic positioning means provided in the on-water control means, wherein when the multiple underwater vehicles are introduced into underwater from a mother ship, the on-water control means is first launched and then, the multiple underwater vehicles are sequentially introduced into underwater.

12. The introducing method of the underwater vehicle according to claim 11, wherein the first launched on-water control means moves such that it separates from the mother ship by a predetermined distance after the on-water control means launches.

13. The introducing method of the underwater vehicle according to claim 11, wherein introducing order of the multiple underwater vehicles is determined while taking settling speed and/or submerging speed of the underwater vehicles into account.

14. The introducing method of the underwater vehicle according to claim 11, wherein exploration depths of the multiple underwater vehicles are set in the underwater vehicles on the mother ship, and the exploration depths are input to the on-water control means.

15. A recovering method of underwater vehicle used for the control method of the underwater vehicles according to claim 1, wherein when the multiple underwater vehicles are recovered from underwater, after the multiple underwater vehicles are sequentially recovered from the underwater in a mother ship, the on-water control means is recovered.

16. The recovering method of the underwater vehicle according to claim 15, wherein the later recovered on-water control means keeps on standby at a position separated from the mother ship by a predetermined distance while the multiple underwater vehicles are recovered.

17. The recovering method of the underwater vehicle according to claim 15, wherein recovering order of the multiple underwater vehicles is surfaced order.

18. The recovering method of the underwater vehicle according to claim 15, wherein the on-water control means controls until a recovering operation of the multiple underwater vehicles is completed.

19. The control system of the underwater vehicle according to claim 2, wherein the movement-control means includes a number-managing section which manages number of the multiple underwater vehicles.

20. The control system of the underwater vehicle according to claim 2, wherein the movement-control means controls movement such that the multiple underwater vehicles are located in the control region where the multiple underwater vehicles and the on-water control means can communicate with each other.

21. The control system of the underwater vehicle according to claim 19, wherein when the movement-control means moves the on-water control means, the movement-control means controls such that the on-water control means moves within a range where the number of the multiple underwater vehicles located in the control region when the movement is started is not reduced.

22. The control system of the underwater vehicle according to claim 19, wherein the number-managing section manages number of the underwater vehicles while taking, into account, the number of uncontrollable underwater vehicles including any of: the underwater vehicle which deviates from the control region; the damaged underwater vehicle; and the emergency surfaced underwater vehicle.

* * * * *